(12) United States Patent
Freiderich et al.

(10) Patent No.: US 11,186,893 B2
(45) Date of Patent: Nov. 30, 2021

(54) RARE EARTH AMIDE COMPOSITIONS

(71) Applicant: UT-Battelle, LLC, Oak Ridge, TN (US)

(72) Inventors: John William Freiderich, Oak Ridge, TN (US); Huimin Luo, Knoxville, TN (US); Bruce A. Moyer, Oak Ridge, TN (US); Sheng Dai, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/881,532

(22) Filed: May 22, 2020

(65) Prior Publication Data

US 2020/0370144 A1 Nov. 26, 2020

Related U.S. Application Data

(62) Division of application No. 15/135,753, filed on Apr. 22, 2016, now Pat. No. 10,689,727.

(60) Provisional application No. 62/151,567, filed on Apr. 23, 2015.

(51) Int. Cl.
*C22B 3/00* (2006.01)
*C22B 3/28* (2006.01)
*C22B 59/00* (2006.01)

(52) U.S. Cl.
CPC .............. *C22B 3/286* (2021.05); *C22B 59/00* (2013.01); *Y02P 10/20* (2015.11)

(58) Field of Classification Search
CPC .......... C01F 17/30; C01F 17/20; C01F 17/17; C01F 17/0006; C22B 59/00; C22B 3/0014
USPC ...................................................... 423/21.5
See application file for complete search history.

(56) References Cited

U.S. PATENT DOCUMENTS

| | | | |
|---|---|---|---|
| 3,468,622 A | 9/1969 | Pobiner | |
| 4,721,606 A | 1/1988 | Tilley | |
| 4,770,807 A * | 9/1988 | Musikas | C22B 3/0024 252/184 |
| 6,086,769 A | 7/2000 | Kilambi et al. | |
| 6,306,276 B1 | 10/2001 | Nobe et al. | |
| 7,138,643 B2 | 11/2006 | Lewis et al. | |
| 2014/0072485 A1 | 3/2014 | Luo et al. | |
| 2014/0234187 A1 * | 8/2014 | Goto | C07C 237/06 423/21.5 |
| 2014/0246370 A1 | 9/2014 | Strassner et al. | |
| 2014/0311294 A1 * | 10/2014 | Jacobson | B09B 3/0016 75/392 |

FOREIGN PATENT DOCUMENTS

| | | | |
|---|---|---|---|
| EP | 210928 | * | 2/1987 |
| WO | WO 2014/047195 A1 | | 3/2014 |

OTHER PUBLICATIONS

Villemin, D. et al., "Extraction of Rare Earth and Heavy Metals, Using Ionic Solvents as Extraction Medium (A Review)", Orient. J. Chem., (2013), vol. 29, No. 4, pp. 1267-1284.
Binnemans, K. et al., "Lanthanides and Actinides in Ionic Liquids", Chem. Rev. (2007), vol. 107, pp. 2592-2614.
Freiderich, J. W. et al., "Dissolution of the Rare-Earth Mineral Bastnaesite by Acidic Amide Ionic Liquid for Recovery of Critical Materials", Eur. J. Inorg. Chem., (2015), pp. 4354-4361.
Luo, H. et al., "Solvent Extraction of Sr2+ and Cs+ using Protic Amide-Based Ionic Liquids", Separation Science and Technology, (2010), vol. 45, pp. 1679-1688.
Rout, A. et al., "Liquid-liquid extraction of neodymium (III) by dialkylphosphate ionic liquids from acidic medium: the importance of the ionic liquid cation", Phys. Chem. Chem. Phys., (2013), vol. 15, pp. 16533-16541.
Shen et al., "Solvent extraction of lanthanides and yttrium from aqueous solution with methylimidaole in an ionic liquid", Dalton Trans. 2014, 43, pp. 10023-10032 (Year: 2014).

* cited by examiner

*Primary Examiner* — Steven J Bos
(74) *Attorney, Agent, or Firm* — Scully, Scott, Murphy & Presser, P.C.

(57) ABSTRACT

A method for extracting a rare earth element from a rare earth-containing substance, the method comprising mixing the rare earth-containing substance with a protic ionic liquid, such as:

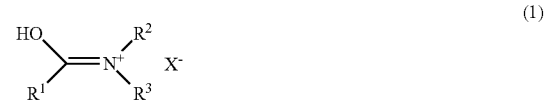

(1)

wherein $R^1$ is selected from hydrogen atom and hydrocarbon groups containing 1 to 6 carbon atoms; $R^2$ and $R^3$ are independently selected from hydrocarbon groups containing 1 to 12 carbon atoms; and $X^-$ is an anionic species; to produce a composition of the formula $(RE)(amide)_y X_z$ at least partially dissolved in the protic ionic liquid, wherein RE is at least one rare earth element having an atomic number selected from 39, 57-71, and 90-103; y is 2-6; z is a number that charge balances the total positive charge of RE; and the amide is the conjugate base of the cationic portion of the protic ionic liquid of Formula (1) and has the following formula:

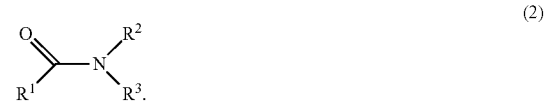

(2)

11 Claims, 10 Drawing Sheets

RARE EARTH AMIDE COMPOSITIONS

CROSS REFERENCE TO RELATED APPLICATION

The present application is a divisional of U.S. patent application Ser. No. 15/135,753 filed Apr. 22, 2016, which claims benefit of U.S. Provisional Application No. 62/151,567, filed on Apr. 23, 2015, all of the contents of which are incorporated herein by reference.

GOVERNMENT SUPPORT

This invention was made with government support under Prime Contract No. DE-AC05-00OR22725 awarded by the U.S. Department of Energy. The government has certain rights in the invention.

FIELD OF THE INVENTION

The present invention relates generally to methods for extracting rare earth elements from a rare earth-containing substance, and more particularly, to methods in which such rare earth elements are extracted into one or more ionic liquids.

BACKGROUND OF THE INVENTION

Rare-earth elements play an important role in modern technologies including, but not limited to, high-strength magnets and energy-efficient fluorescent lighting. The rare earths (REs) typically encompass 15 members of the 4f row (lanthanides, Z=57-71) and a second-row transition metal, yttrium (Z=39). The rare earths may also be considered to encompass the actinide elements (Z=89-103). Many of the rare earths occur in nature except for man-made promethium (Z=59) and several of the actinides. The lanthanides and yttrium are all thermodynamically stable trivalent ions in solution and the solid state. In addition, a phenomenon known as the lanthanide contraction is observed. This phenomenon displays an incremental decrease in the radius of the $RE^{3+}$ ion from $La^{3+}$ to $Lu^{3+}$. As a result of the stable 3+ oxidation state and the small changes in ionic radii between adjacent lanthanides and actinides, separating rare earths is challenging. In addition to lanthanides and actinides having such similar solution chemistries, the rare earths also require their ores to be processed, which has a number of industrial challenges.

The demand on industry to provide an accessible supply of these materials is ever-increasing as rare earths continue to play a more important role in applications related to modern technology. As of 2011, the majority of world rare-earth element production is in China (95%), with Australia (2%) and India (2.5%) contributing substantially less, and Brazil and Malaysia contributing the remainder (0.47%) (e.g., Gschneidner Jr., *Mater. Matters* (Aldrich) 2011, 6, 32-37). In China and the U.S., bastnaesite is the mineral of most interest for rare-earth recovery. Bastnaesite, a rare-earth carbonate fluoride ($RECO_3F$) mineral, is approximately 7-10% rare-earth oxide (REO) consisting mostly of the lighter elements (ca. 98% La—Nd) (e.g., J. B. Hedrick, "Rare Earths," in Metals and Minerals, U.S. Geological Survey Minerals Yearbook 2001, vol. I, 61.1-61.17).

Historically, bastnaesite has undergone a series of physicochemical processes to produce a commercial product. Considering the flow sheet for bastnaesite employed by Molycorp (F. F. Aplan, The processing of rare-earth minerals. The Minerals, Metals and Materials Society, Warrendale, Pa., USA, 1988), the following generalized process may be written:

Bastnaesite ore (7% REO)→crushing/grinding→conditioning→series of flotation steps→leaching→calciner→bastnaesite→concentrate (90% REO)→separation plant After this beneficiation process, chemical treatment of either the crude ore or the bastnaesite concentrate may take place, e.g., P. R. Kruesi, G. Duker,*Min. Met. Mater. S* 1965, 17, 847. The process involves leaching bastnaesite with hydrochloric acid, treating the resulting rare-earth fluorides ($REF_3$) with sodium hydroxide, and finally, solubilizing the rare-earth hydrolysis product with hydrochloric acid. In general, this process employs the following steps:

$3RECO_3F+9HCl \rightarrow REF_3+2RECl_3+3HCl+3H_2O+3CO_2$
$REF_3+3NaOH \rightarrow RE(OH)_3+3NaF$
$RE(OH)_3+3HCl \rightarrow RECl_3+3H_2O$ However, this chemical treatment process requires heating of the ore and industrial solutions to roughly 95° C. for 4 hours at different stages and the consumption of 2.5 kg HCl/kg of $RE_2O_3$ and 0.73 kg NaOH/kg REO feed to achieve the final product. Considering the significant expenditures in energy, time, and cost for current rare earth extraction methods, there would be a significant benefit in a simplified and less costly process for achieving the same end.

SUMMARY OF THE INVENTION

The invention is directed to methods for extracting one or more rare earth elements from a rare earth-containing substance by mixing the rare earth-containing substance with one or more protic ionic liquids that form a complex with one or more of the rare earth elements, wherein the complex is at least partially soluble in the protic ionic liquid and/or a solvent (e.g., a non-aqueous solvent) in which the protic ionic liquid is dissolved. The invention is also directed to methods for at least partially separating one rare earth element from another rare earth element, particularly among lanthanide elements, from a rare earth-containing substance containing a mixture of such elements. The invention accomplishes this separation by virtue of an ability of the protic ionic liquid to better dissolve one or more rare earth elements compared to one or more other rare earth elements.

In one set of embodiments, the protic ionic liquid includes a protonated (i.e., positively-charged) carboxamide-containing species. The protic ionic liquid can be conveniently expressed by the following formula:

(1)

wherein $R^1$ is selected from hydrogen atom and hydrocarbon groups containing at least 1 and up to 12 carbon atoms; $R^2$ and $R^3$ are independently selected from hydrocarbon groups containing at least 1 and up to 12 carbon atoms; and $X^-$ is an anionic species.

When using the protic ionic liquid according to Formula (1), the mixing process results in a solution containing a rare earth composition of the formula $(RE)(amide)_yX_z$ at least partially dissolved in the protic ionic liquid and/or a solvent in which the protic ionic liquid is dissolved, wherein RE is at least one rare earth element having an atomic number selected from 39, 57-71, and 90-103 and having a positive oxidation state; y is generally 2-6; z is a number that serves to charge balance the total positive charge of the at least one rare earth metals (RE); X is equivalent to $X^-$ in the ionic liquid of Formula (1); and the amide is the conjugate base of the cationic portion of the protic ionic liquid of Formula (1) and has the following formula:

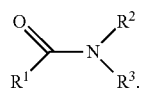

(2)

In another set of embodiments, the protic ionic liquid is a protonated (i.e., positively-charged) phosphine oxide-containing species. The protic ionic liquid can be conveniently expressed by the following formula:

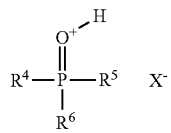

(4)

wherein $R^4$, $R^5$, and $R^6$ are independently selected from hydrocarbon groups (R) containing at least 1 and up to 12 carbon atoms and alkoxide groups —OR; and $X^-$ is an anionic species.

When using the protic ionic liquid according to Formula (4), the mixing process results in a solution containing a rare earth composition of the formula $(RE)(phos)_y X_z$ at least partially dissolved in the protic ionic liquid or a solvent in which the protic ionic liquid is dissolved, wherein RE is at least one rare earth element having an atomic number selected from 39, 57-71, and 90-103 and having a positive oxidation state; y is generally 2-6; z is a number that serves to charge balance the total positive charge of the at least one rare earth metals (RE); X is equivalent to $X^-$ in the ionic liquid of Formula (4); and the phos group is the conjugate base of the cationic portion of the protic ionic liquid of Formula (4) and has the following formula:

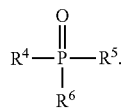

(5)

The above-described methods represent a significant advance in the extraction of rare earth metals at least in view of their simplification of the process and the associated lower energy demand and diminished cost. The ability of the described methodology to also selectively extract one or more rare earth elements from one or more other rare earth elements represents a further significant advance.

BRIEF DESCRIPTION OF THE DRAWINGS

FIG. 4A shows FTIR-ATR spectra of synthetic bastnaesite and $RECO_3F$ solids, while FIG. 4B compares the FTIR-ATR spectra of $RECO_3F$ with $RE_2(CO_3)_3$ solids. Designations are as follows: (4a.1) Bastnaesite-Mtn Pass Blend, (4a.2) Bastnaesite-10% Heavies Blend, (4a.3) $LaCO_3F$, (4a.4) $CeCO_3F$, (4a.5) $PrCO_3F$, (4a.6) $NdCO_3F$, (4a.7) $TbCO_3F$, (4a.8) $DyCO_3F$, (4a.9) $HoCO_3F$, (4a.10) $YCO_3F$, (4b.1) $TbCO_3F$, (4b.2) $YCO_3F$, (4b.3) $Tb_2(CO_3)_3 \cdot xH_2O$, and (4b.4) $Y_2(CO_3)_3 \cdot xH_2O$.

FIG. 8A shows initial (bottom) and final (top) absorbance spectra and FIG. 8B shows speciation of $Nd^{3+}$ in $BMIM^+NTf_2^-$ at 120° C. The following species are present: 0: $Nd^{3+}$; 1: $Nd(DMA)^{3+}$; 2: $Nd(DMA)_2^{3+}$; 3: $Nd(DMA)_3^{3+}$; 4: $Nd(DMA)_4^{3+}$; 5: $Nd(DMA)_5^{3+}$. Experimental $Nd^{3+}$/DMA ratios range from 1:0 to 1:7.25. Note: the Nd spectra are shifted in order to display the features of each.

DETAILED DESCRIPTION OF THE INVENTION

Figure 1:
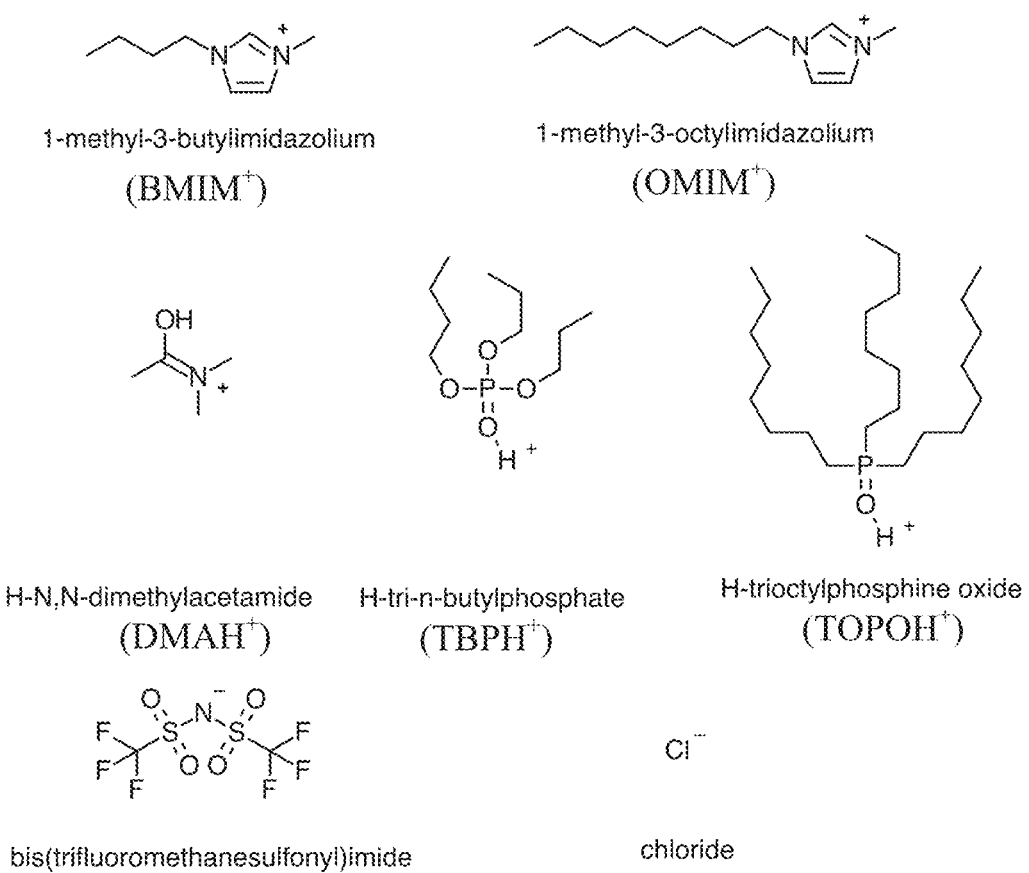
FIG. 1. Structures of the cationic and anionic components of the ionic liquids used in the instant application for extraction of rare earth metals.

The extraction method can be applied on any rare earth-containing substance, particularly a solid substance containing one or more rare earth elements, typically in salt form, such as a carbonate, oxide, and/or halide of the at least one rare earth element. In particular embodiments, the rare earth element is selected from a lanthanide (i.e., an element having an atomic number of 57-71) and/or an actinide (i.e., an element having an atomic number of 89-103) or a subset of elements therein. Some examples of lanthanide elements include yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). Some examples of actinide elements include actinium (Ac), thorium (Th), protactinium (Pa), and uranium (U). In any of these embodiments, the rare earth elements may or may not also include yttrium (atomic number of 39). In some embodiments, the rare earth-containing substance is a rare earth-containing mineral, such as bastnaesite, which, at least in one of its forms, has the approximate composition (Ce, La)CO$_3$F. As well known in the art, bastnaesite may include other rare earth elements, typically the lanthanides with atomic numbers selected from 39 and 57-71, and may also have a percentage of hydroxy (OH) groups replacing F atoms. In other embodiments, the rare earth-containing substance is waste or effluent emanating from, for example, a recycling process, mining process, or nuclear energy process. The rare earth-containing substance may or may not also include one or more alkaline earth species (e.g., Me, Ca$^{2+}$, Sr$^{2+}$, or Ba$^{2+}$) and/or one or more alkali species (e.g., Li$^+$, Na$^+$, K$^+$, Rb$^+$, or Cs$^+$). In some embodiments, any one or more of the foregoing rare earth or other elements are not present in the rare earth-containing substance.

In the method for extracting one or more rare earth elements from a rare earth-containing substance, the rare earth-containing substance is mixed with one or more protic ionic liquids according to Formula (1) or Formula (4) that form a complex with one or more of the rare earth elements, wherein the complex is at least partially soluble in the protic ionic liquid and/or a solvent (e.g., a non-aqueous solvent) in which the protic ionic liquid is dissolved. The mixing process should be sufficiently intimate and rigorous so as to maximize the extraction potential of the protic ionic liquid being used under the conditions (e.g., temperature and pressure) used. The intimate mixing can be achieved by any of the methods known in the art, such as by manual or mechanical stirring, vibrating, shaking, or tumbling. In some embodiments, high-speed stirring by use of a high-speed mixer is used. The high-speed mixer may provide a stirring speed of at least, for example, 100, 200, 500, 1000, 1500, or 2000 revolutions per minute (rpm). The mixing process may also include grinding of the rare earth-containing substance either before or during contact with the protic ionic liquid.

The mixing process may also employ any suitable temperature below the temperature at which the protic ionic liquid decomposes. In different embodiments, a temperature of about, at least, above, up to, or less than, for example, 20, 30, 40, 50, 60, 70, 80, 90, 100, 120, 150, 180, or 200° C. may be employed, wherein the term "about" generally indicates within ±0.5%, 1%, 2%, 5%, or up to ±10% of the indicated value. Typically, the mixing step is conducted at standard pressure (approximately 1 atm); however, in some embodiments, an elevated pressure may be used, such as a pressure of about or at least, for example, 1.5, 2, 2.5, 3, 4, 5, or 10 atm, or a reduced pressure may be used, such as up to or below, 1, 0.8, 0.5, or 0.1 atm, or even up to or below 1000, 500, 200, 100, 50, 20, or 10 mTorr. A lower pressure, in particular, could help evacuate the gaseous phases, such as water and carbon dioxide, and leave the ionic liquid behind as well as the RE products.

The protic ionic liquid functions to dissolve at least a portion of one or more rare earth elements from the rare earth-containing substance into the protic ionic liquid or into a solvent in which the protic ionic liquid is dissolved. The extent of extraction can be quantified as the amount of rare earth metal extracted into solution vs. the total amount of rare earth metal originally present in the rare earth-containing substance. The foregoing proportion may also be termed the "extraction efficiency". The extraction efficiency of the process is typically at least 10%, and may be, for example, at least 15, 20, 25, 30, 35, 40, 45, 50, 60, 70, 80, 90, 95, or 98%. In some embodiments, the protic ionic liquid extracts one or more rare earth elements to a greater degree (i.e., at a higher extraction efficiency) than one or more other rare earth elements, thereby enriching the protic ionic liquid or the solvent in which it may be dissolved to a greater degree with one or more of the rare earth elements as compared to one or more of the other rare earth elements. For example, in some embodiments, the rare earth-containing substance includes at least one of a first rare earth element selected from lanthanum, cerium, praseodymium, and neodymium and at least one of a second rare earth element selected from europium, terbium, dysprosium, holmium, and yttrium, and the protic ionic liquid dissolves at least one of the second rare earth element to a greater degree than at least one of the first rare earth element, thereby enriching the protic ionic liquid or a solvent in which it may be dissolved to a greater degree with at least one of the second rare earth element than at least one of the first rare earth element.

As well known in the art, the term "ionic liquid" refers to an ionic compound that is a liquid without being dissolved in a solvent. The ionic liquids considered herein are typically liquid at room temperature (e.g., 15, 18, 20, 22, 25, or 30° C.) or lower. However, in some embodiments, the ionic liquid may become a liquid at a higher temperature than 30° C. if the process is conducted at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C. The term "protic" (as in the term "protic ionic liquid") refers to the presence of an acidic proton in the ionic liquid, as exemplified in the protic ionic liquids in Formulas (1) and (4)

In one set of embodiments, the protic ionic liquid contains a protonated amide (i.e., amidium) species. These types of protic ionic liquids can be expressed by the following formula:

In the above Formula (1), R$^1$ is selected from hydrogen atom (H) and hydrocarbon groups (R) containing at least 1 and up to 12 carbon atoms; R$^2$ and R$^3$ are independently selected from hydrocarbon groups containing at least 1 and up to 12 carbon atoms; and X$^-$ is an anionic species. When any of R$^1$, R$^2$, and R$^3$ are hydrocarbon groups, the hydrocarbon groups may independently contain 1, 2, 3, 4, 5, 6, 7, 8, 9, 10, 11, or 12 carbon atoms, or independently, a number of carbon atoms within a range bounded by any two of the foregoing number of carbon atoms (e.g., a number of carbon atoms of 1-8, 1-6, 1-4, or 1-3).

Moreover, it is apparent that the amidium species shown in Formula (1) is in flux with its tautomer, as shown in the following equation:

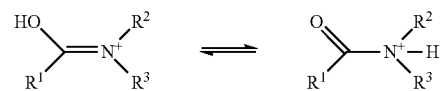

In some embodiments of Formula (1), $R^1$, $R^2$, and $R^3$ are all hydrogen atoms. In other embodiments, at least $R^1$ is a hydrocarbon group, or at least one or two of $R^1$, $R^2$, and $R^3$ or at least one or both of $R^2$ and $R^3$ are hydrocarbon groups independently containing 1, 2, 3, 4, 5, 6, 7, 8, 9, 10, 11, or 12 carbon atoms. In a third set of embodiments, all of $R^1$, $R^2$, and $R^3$ are hydrocarbon groups independently containing 1, 2, 3, 4, 5, 6, 7, 8, 9, 10, 11, or 12 carbon atoms.

In a first set of embodiments, one or more of the hydrocarbon groups (R) are selected from saturated groups composed solely of carbon and hydrogen and containing at least one carbon-hydrogen bond. The hydrocarbon groups (R) can be selected from, for example, straight-chained alkyl groups, branched alkyl groups, and cycloalkyl groups. Some examples of straight-chained alkyl groups include methyl, ethyl, n-propyl, n-butyl, n-pentyl, n-hexyl, n-heptyl, n-octyl, n-nonyl, n-decyl, n-undecyl, and n-dodecyl groups. Some examples of branched alkyl groups include isopropyl (2-propyl), isobutyl (2-methylprop-1-yl), sec-butyl (2-butyl), t-butyl, 2-pentyl, 3-pentyl, 2-methylbut-1-yl, isopentyl (3-methylbut-1-yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, and isohexyl (4-methylpent-1-yl) groups, wherein the "1-yl" suffix represents the point of attachment of the group. Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane).

In a second set of embodiments, one or more of the hydrocarbon groups (R) are selected from unsaturated groups composed solely of carbon, or carbon and hydrogen. The unsaturated hydrocarbon groups (R) can be selected from, for example, straight-chained alkenyl (olefinic) or alkynyl groups, branched alkenyl or alkynyl groups, aliphatic carbocyclic groups, and aromatic carbocyclic groups. Some examples of straight-chained alkenyl groups include vinyl, propen-1-yl (allyl), 3-buten-1-yl ($CH_2$=CH—$CH_2$—$CH_2$-), 2-buten-1-yl ($CH_2$—CH=CH—$CH_2$-), butadienyl, and 4-penten-1-yl groups. Some examples of branched alkenyl groups include propen-2-yl, 3-buten-2-yl ($CH_2$=CH—CH.—$CH_3$), 3-buten-3-yl ($CH_2$=C.—$CH_2$—$CH_3$), 4-penten-2-yl, 4-penten-3-yl, 3-penten-2-yl, 3-penten-3-yl, and 2,4- pentadien-3-yl groups, wherein the dot in the foregoing exemplary formulas represents a radical or the point of attachment of the group. Some examples of aliphatic carbocyclic groups include cyclopropenyl, cyclobutenyl, cyclopentenyl, cyclopentadienyl, cyclohexenyl, and cyclohexadienyl groups. Some examples of aromatic carbocyclic groups include phenyl and benzyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene.

In some embodiments, the hydrocarbon group (R) group may include one or more heteroatoms (i.e., non-carbon and non-hydrogen atoms), such as one or more heteroatoms selected from oxygen, nitrogen, sulfur, silicon, phosphorus, boron, and halide atoms, as well as groups containing one or more of these heteroatoms (i.e., heteroatom-containing groups). Some examples of oxygen-containing groups include hydroxy (OH), alkoxy (OR), carbonyl-containing (e.g., carboxylic acid, ketone, aldehyde, carboxylic ester, amide, and urea functionalities), nitro ($NO_2$), carbon-oxygen-carbon (ether), sulfonyl, and sulfinyl (i.e., sulfoxide) groups. Some particular examples of alkoxy groups —OR include methoxy, ethoxy, n-propoxy, isopropoxy, n-butoxy, isobutoxy, t-butoxy, phenoxy, benzyloxy, 2-hydroxyethoxy, 2-methoxyethoxy, 2-ethoxyethoxy, vinyloxy, and allyloxy groups. In the case of an ether group, the ether group can also be a polyalkyleneoxide (polyalkyleneglycol) group, such as a polyethyleneoxide group. Some examples of nitrogen-containing groups include primary amine, secondary amine, tertiary amine (i.e., —$NR_2$ or —$NR_3^+$, wherein R is independently selected from H and hydrocarbon groups set forth above), nitrile, amide (i.e., —C(O)$NR_2$ or —NRC(O)R, wherein R is independently selected from hydrogen atom and hydrocarbon groups set forth above), imine (e.g., —CR=NR, wherein R is independently H or a hydrocarbon group), oxime (—CR=N—OH), amidoxime (—C($NH_2$)=N—OH), nitro, urea (—NR—C(O)—$NR_2$, wherein R is independently H or a hydrocarbon group), and carbamate groups (—NR—C(O)—OR, wherein R is independently H or a hydrocarbon group). Some examples of phosphorus-containing groups include —$PR_2$, —$PR_3^+$, —P(=O)$R_2$, —P(OR)$_2$, —O—P(OR)$_2$, —R—P(OR)$_2$, —P(=O)(OR)$_2$, —O—P(=O)(OR)$_2$, —O—P(=O)(OR)(R), —O—P(=O)$R_2$, —R—P(=O)(OR)$_2$, —R—P(=O)(OR)(R), and —R—P(=O)$R_2$ groups, wherein R is independently selected from hydrogen atom and hydrocarbon groups set forth above. Some examples of sulfur-containing groups include mercapto (i.e., —SH), thioether (i.e., sulfide, e.g., —SR), disulfide (—R—S—S—R), sulfoxide (—S(O)R), sulfone (—$SO_2$R), sulfonate (—S(=O)$_2$OR, wherein R is H, a hydrocarbon group, or a cationic group), and sulfate groups (—OS(=O)$_2$OR, wherein R is H, a hydrocarbon group, or a cationic group). Some examples of halide atoms include fluorine, chlorine, bromine, and iodine. One or more of the heteroatoms described above (e.g., oxygen, nitrogen, and/or sulfur atoms) can be inserted between carbon atoms (e.g., as —O—, —NR—, or —S—) in any of the hydrocarbon groups described above to form a heteroatom-substituted hydrocarbon group. Alternatively, or in addition, one or more of the heteroatom-containing groups can replace one or more hydrogen atoms on the hydrocarbon group. In some embodiments, any one or more of the above heteroatoms or heteroatom groups may be excluded from the hydrocarbon (R).

The anion ($X^-$) of the protic ionic liquid is any anion which, when associated with the protonated cationic component, permits the resulting ionic compound to behave as an ionic liquid. As known in the art, the composition and structure of the anion strongly affects the properties (e.g., melting point, volatility, stability, viscosity, hydrophobicity, and so on) of the ionic liquid. In some embodiments, the anion is structurally symmetrical, while in other embodiments, the anion is structurally asymmetrical. Although the anion ($X^-$) in the ionic liquid is typically monovalent (i.e., charge of −1), as depicted in Formulas (1) and (4), the anion may have a higher valency (e.g., charge of −2 or −3), in which case the stoichiometric ratio between the protonated cation species and anion would be other than 1:1 in order for charge neutrality to be preserved in the ionic liquid molecule. The anion ($X^-$) is intended to encompass anions having any valency, unless otherwise stated.

In one embodiment, the anion ($X^-$) of the ionic liquid is non-carbon-containing (i.e., inorganic). The inorganic anion may, in one embodiment, lack fluorine atoms. Some examples of such anions include chloride, bromide, iodide, hexachlorophosphate ($PCl_6^-$), perchlorate, chlorate, chlorite, cyanate, isocyanate, thiocyanate, isothiocyanate, per-bromate, bromate, bromite, periodate, iodate, dicyanamide (i.e., $N(CN)_2^-$), tricyanamide (i.e., $N(CN)_3^-$), aluminum chlorides (e.g., $Al_2Cl_7^-$ and $AlCl_4^-$), aluminum bromides (e.g., $AlBr_4^-$), nitrate, nitrite, sulfate, sulfite, hydrogensulfate, hydrogensulfite, phosphate, hydrogenphosphate ($HPO_4^{2-}$), dihydrogenphosphate ($H_2PO_4^-$), phosphite, arsenate, antimonate, selenate, tellurate, tungstate, molybdate, chromate, silicate, the borates (e.g., borate, diborate, triborate, tetraborate), anionic borane and carborane clusters (e.g., $B_{10}H_{10}^{2-}$ and $B_{12}H_{12}^{2-}$, perrhenate, permanganate, ruthenate, perruthenate, and the polyoxometallates. The inorganic anion may, in another embodiment, include fluorine atoms. Some examples of such anions include fluoride, bifluoride ($HF_2^-$), hexafluorophosphate ($PF_6^-$), fluorophosphate ($PO_3F^{2-}$), tetrafluoroborate ($BF_4^-$), aluminum fluorides (e.g., $AlF_4^-$), hexafluoroarsenate ($AsF_6^-$), and hexafluoroantimonate ($SbF_6^-$).

In another embodiment, the anion ($X^-$) of the ionic liquid is carbon-containing (i.e., organic). The organic anion may, in one embodiment, lack fluorine atoms. Some examples of such anions include carbonate, bicarbonate, the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), the alkylsulfates (e.g., diethylsulfate), alkylphosphates (e.g., ethylphosphate or diethylphosphate), and the phosphinates (e.g., bis-(2,4,4-trimethylpentyl)phosphinate). The organic anion may, in another embodiment, include fluorine atoms. Some examples of such anions include the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In particular embodiments, the anion ($X^-$) of the ionic liquid has a structure according to the following general formula:

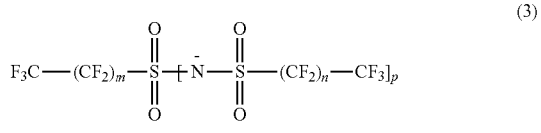

(3)

In Formula (3) above, subscripts m and n are independently 0 or an integer of 1 or above. Subscript p is 0 or 1, provided that when p is 0, the group $-N-SO_2-(CF_2)_nCF_3$ subtended by p is replaced with an oxide atom connected to the sulfur atom (S).

In one embodiment of Formula (3), subscript p is 1, so that Formula (3) reduces to the chemical formula:

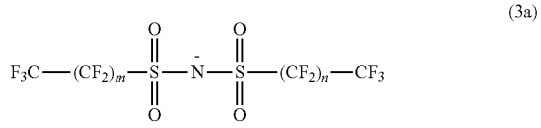

(3a)

In one embodiment of Formula (3a), m and n are the same number, thereby resulting in a symmetrical anion. In another embodiment of formula (3a), m and n are not the same number, thereby resulting in an asymmetrical anion.

In a first set of embodiments of Formula (3a), m and n are independently at least 0 and up to 1, 2, 3, 4, 5, 6, 7, 8, 9, 10, or 11. When m and n are both 0, the resulting anion has the formula $F_3CSO_2NSO_2CF_3$, i.e., bis-(trifluoromethylsulfonyl)imide, or $Tf_2N^-$. In another embodiment, m and n are not both 0. For example, in a particular embodiment, m is 0 while n is a value of 1 or above (e.g., 1, 2, 3, 4, 5, 6, 7, 8, 9, 10, or 11). Some examples of such anions include $F_3CSO_2NSO_2CF_2CF_3$, $F_3CSO_2NSO_2(CF_2)_2CF_3$, $F_3CSO_2NSO_2(CF_2)_3CF_3$, $F_3CSO_2NSO_2(CF_2)_4CF_3$, $F_3CSO_2NSO_2(CF_2)_5CF_3$, and so on, wherein it is understood that, in the foregoing examples, the negative sign indicative of a negative charge (i.e., "-") in the anion has been omitted for the sake of clarity.

In a second set of embodiments of Formula (3a), m and n are independently at least 1 and up to 2, 3, 4, 5, 6, 7, 8, 9, 10, or 11. For example, in a particular embodiment, m is 1 while n is a value of 1 or above (e.g., 1, 2, 3, 4, 5, 6, 7, 8, 9, 10, or 11). Some examples of such anions include $N[SO_2CF_2CF_3]_2$(i.e., "BEIT"), $F_3CF_2CSO_2NSO_2(CF_2)_2CF_3$, $F_3CF_2CSO_2NSO_2(CF_2)_3CF_3$, $F_3CF_2CSO_2NSO_2(CF_2)_4CF_3$, $F_3CF_2CSO_2NSO_2(CF_2)_5CF_3$, and so on.

In a third set of embodiments of Formula (3a), m and n are independently at least 2 and up to 3, 4, 5, 6, 7, 8, 9, 10, or 11. For example, in a particular embodiment, m is 2 while n is a value of 2 or above (e.g., 2, 3, 4, 5, 6, 7, 8, 9, 10, or 11). Some examples of such anions include $N[SO_2(CF_2)_2CF_3]_2$, $F_3C(F_2C)_2SO_2NSO_2(CF_2)_3CF_3$, $F_3C(F_2C)_2SO_2NSO_2(CF_2)_4CF_3$, $F_3C(F_2C)_2SO_2NSO_2(CF_2)_5CF_3$, and so on.

In a fourth set of embodiments of Formula (3a), m and n are independently at least 3 and up to 4, 5, 6, 7, 8, 9, 10, or 11. For example, in a particular embodiment, m is 3 while n is a value of 3 or above (e.g., 3, 4, 5, 6, 7, 8, 9, 10, or 11). Some examples of such anions include $N[SO_2(CF_2)_3CF_3]_2$, $F_3C(F_2C)_3SO_2NSO_2(CF_2)_4CF_3$, $F_3C(F_2C)_3SO_2NSO_2(CF_2)_5CF_3$, $F_3C(F_2C)_3SO_2NSO_2(CF_2)_6CF_3$, $F_3C(F_2C)_3SO_2NSO_2(CF_2)_7CF_3$, and so on.

In another embodiment of Formula (3), subscript p is 0, so that Formula (3) reduces to the chemical formula:

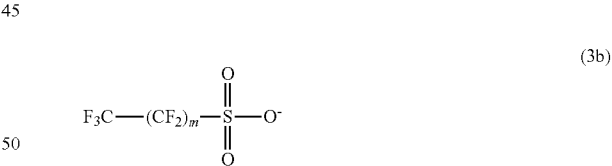

(3b)

In different exemplary embodiments of Formula (3b), m can be 0 or above (e.g., up to 1, 2, 3, 4, 5, 6, 7, 8, 9, 10, or 11), 1 or above (e.g., up to 2, 3, 4, 5, 6, 7, 8, 9, 10, or 11), 2 or above (e.g., up to 3, 4, 5, 6, 7, 8, 9, 10, or 11), 3 or above (e.g., up to 4, 5, 6, 7, 8, 9, 10, or 11), 4 or above (e.g., up to 5, 6, 7, 8, 9, 10, or 11), 5 or above (e.g., up to 6, 7, 8, 9, 10, or 11), 6 or above (e.g., up to 7, 8, 9, 10, or 11), 7 or above (e.g., up to 8, 9, 10, 11, or 12), 8 or above (e.g., up to 9, 10, 11, or 12), or 9 or above (e.g., up to 10, 11, 12, 13, 14, 15, or 16). Some examples of such anions include $F_3CSO_3^-$ (i.e., "triflate" or "TfOb$^-$"), $F_3CF_2CSO_3^-$, $F_3C(F_2C)_2SO_3^-$, $F_3C(F_2C)_3SO_3^-$ (i.e., "nonaflate" or "NfO$^-$"), $F_3C(F_2C)_4SO_3^-$, $F_3C(F_2C)_5SO_3^-$, $F_3C(F_2C)_6SO_3^-$, $F_3C(F_2C)_7SO_3^-$, $F_3C(F_2C)_8SO_3^-$, $F_3C(F_2C)_9SO_3^-$, $F_3C(F_2C)_{10}SO_3^-$, $F_3C(F_2C)_{11}SO_3^-$, and so on.

The protic ionic liquids according to Formula (1) can be synthesized by methods well known in the art, as evidenced by, for example, H. Luo et al., *Separation Science and Technology*, 45: 1679-1688, 2010, the contents of which are herein incorporated by reference in their entirety. In brief, an organic amide (such as in accordance with Formula 2) can be reacted with a mineral acid, such as hydrochloric acid, to protonate the amide, followed by anion exchange of the protonated amide salt with an anion of interest, such as $NTf_2^-$ or $BETI^-$, by reaction of the protonated amide salt with an anion salt (e.g., $LiNTf_2$ or LiBETI), along with removal of salt byproduct (e.g., LiCl).

After mixing of the protic ionic liquid according to Formula (1) with the rare earth-containing substance, a reaction occurs between the protic ionic liquid and one or more of the rare earth elements to produce a complex containing at least the one or more rare earth elements, the anion ($X^-$), and the conjugate base of the cationic (amidium) portion of the protic ionic liquid of Formula (1). The conjugate base of the amidium species is the amide compound resulting from deprotonation of the amidium species. Thus, the conjugate base of the amidium species in Formula (1) has the following formula:

(2)

The rare earth composition containing at least the one or more rare earth elements (RE), the anion ($X^-$), and amide species of Formula (2) can be conveniently expressed by the formula $(RE)(amide)_y X_z$, wherein the foregoing composition becomes at least partially dissolved in the protic ionic liquid (or solvent in which the protic ionic liquid is dissolved) during the mixing process. In the rare earth composition, X is equivalent to $X^-$ shown in Formula (1). The subscript y is generally 2-6 (or, e.g., 2-5, 3-5, or 3-6), depending on the rare earth element. The subscript z is a number that serves to charge balance the total positive charge of the at least one rare earth metal (RE). When RE represents a single rare earth element or a combination of rare earth elements having the same oxidation state, and when X is a monovalent anion, then z is an integer equivalent to the oxidation state of the at least one rare earth element RE, as in the sub-formula $(RE)(amide)_y X_3$, in the case where RE represents a rare earth element having a +3 oxidation state and X is a monovalent anion. In a case where RE represents a rare earth element having a +3 oxidation state and X is a divalent anion, the rare earth composition may be expressed as $(RE)_2(amide)_y X_3$, in which case the subscript y may also require adjustment in order to reflect the number of amide groups for two or more rare earth elements. The subscript z may also be a fractional number in the event that RE represents at least two rare earth elements differing in oxidation state. If, for example, RE represents two rare earth elements having oxidation states of +3 (e.g., La) and +4 (e.g., Ce) at 1:1 molar ratio, and if X is a monovalent anion, the composition may be expressed by the sub-formula $(RE)(amide)_y X_{3.5}$. The rare earth composition may or may not include additional metallic species (e.g., one or more alkali or alkaline earth species), one or more neutral molecules, or one or more anionic species.

In another set of embodiments, the protic ionic liquid contains a protonated phosphine oxide species. These types of protic ionic liquids can be expressed by the following formula:

(4)

In the above Formula (4), $R^4$, $R^5$, and $R^6$ are independently selected from hydrocarbon groups (R), as described above, containing at least 1 and up to 12 carbon atoms and/or selected from alkoxide groups —OR. In some embodiments, $R^4$, $R^5$, and $R^6$ are all the same or different hydrocarbon groups (R). In other embodiments, $R^4$, $R^5$, and $R^6$ are all the same or different alkoxide groups (—OR). In yet other embodiments, $R^4$, $R^5$, and $R^6$ are a mix of hydrocarbon groups and alkoxide groups. $X^-$ is an anionic species, as described above.

The protic ionic liquids according to Formula (4) may be synthesized analogously to protic ionic liquids of Formula (1) by, for example, protonating a phosphine oxide-containing compound, such as according to Formula (5), with a mineral acid (e.g., hydrochloric acid), followed by anion exchange of the protonated phosphine oxide-containing salt with an anion of interest, such as $NTf_2^-$ or $BETI^-$, by reaction of the protonated phosphine oxide-containing salt with an anion salt (e.g., $LiNTf_2$ or LiBETI), along with removal of salt byproduct (e.g., LiCl).

The protic ionic liquid according to Formula (4) is mixed with the rare earth-containing substance in accordance with the mixing process described above for the protic ionic liquid according to Formula (1). As in the case of the amidium ionic liquid of Formula (1), the mixing process using the protic ionic liquid of Formula (4) results in a solution containing a rare earth complex that contains at least one or more rare earth elements derived from the rare earth-containing substance along with anions ($X^-$) and the deprotonated form (i.e., conjugate base) of the cationic species in Formula (4). The deprotonated form (i.e., conjugate base) of the cationic species in Formula (4) is herein referred to as a "phos" group, which has the following formula:

(5)

Thus, the composition resulting from reaction between the protic ionic liquid of Formula (4) and one or more rare earth elements can be conveniently expressed by the formula $(RE)(phos)_y X_z$, wherein the foregoing composition becomes at least partially dissolved in the protic ionic liquid during the mixing process. In the rare earth composition, X is equivalent to $X^-$ shown in Formula (4). The subscript y is generally 2-6 (or, e.g., 2-5, 3-5, or 3-6), depending on the rare earth element. As discussed above, the subscript z is a number that serves to charge balance the total positive charge of the at least one rare earth metal (RE). All of the examples provided above for compositions containing the neutral amide according to Formula (2) apply herein analogously to compositions containing the neutral phosphine oxide according to Formula (5). Thus, depending on the oxidation state and number of RE elements, and the valency of X, the composition containing phosphine oxide according to Formula (5) may be expressed as, for example, (RE)(phos)$_y$X$_3$, (RE)$_2$(phos)$_y$X$_3$, or (RE)(phos)$_y$X$_{3.5}$.

In some embodiments, the protic ionic liquid according to Formula (1) or (4) is dissolved in a solvent (e.g., an aqueous or non-aqueous solvent different from the protic ionic liquid) at the time the protic ionic liquid is contacted with and mixed with the rare earth-containing substance. The protic ionic liquid may be dissolved in the solvent before or during the mixing process with the rare earth-containing substance. The solvent should not be reactive with the protic ionic liquid, such as by not being capable of deprotonating the protonated cation of the protic ionic liquid. In the method, the protic ionic liquid serves to facilitate dissolution of one or more of the rare earth elements derived from the rare earth-containing substance into the solvent. The protic ionic liquid does this by forming a complex with the one or more rare earth elements, as discussed above, wherein the rare earth-containing complex is at least partially soluble in the solvent.

In one set of embodiments, the solvent in which the protic ionic liquid is dissolved is aqueous-based. The aqueous-based solvent may be water or a solution of water and one or more organic or inorganic solvents soluble in water. The aqueous solution may be, for example, an aqueous alcohol solution.

In another set of embodiments, the solvent in which the protic ionic liquid is dissolved is non-aqueous, i.e., an organic solvent. The organic solvent may be, for example, protic or aprotic, and/or polar or non-polar. Some examples of polar protic organic solvents include the alcohols (e.g., methanol, ethanol, isopropanol, n-butanol, t-butanol, the pentanols, hexanols, octanols, or the like) and diols (e.g., ethylene glycol, diethylene glycol, triethylene glycol). Some examples of polar aprotic organic solvents include the nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,1-trichloroethane), ketones (e.g., acetone, 2-butanone), dialkylcarbonates (e.g., ethylene carbonate, dimethylcarbonate, diethylcarbonate), organoethers (e.g., diethyl ether, tetrahydrofuran, and dioxane), hexamethylphosphoramide acid (HMPA), N-methylpyrrolidone (NMP), 1,3-dimethyl-3,4,5,6-tetrahydro-2(1H)—pyrimidinone (DMPU), propylene glycol methyl ether acetate (PGMEA), and supercritical carbon dioxide. Some examples of non-polar organic solvents include the liquid hydrocarbons, such as a pentane, hexane, heptane, octane, pentene, hexene, heptene, octene, benzene, toluene, and xylene. In some embodiments, a combination of any of the foregoing organic solvents is used as the solvent. In other embodiments, one or more of any of the foregoing classes or specific types of organic solvents is excluded, or an organic solvent is excluded altogether in the mixing process or entire extraction process.

In yet other embodiments, the solvent in which the protic ionic liquid is dissolved is an ionic liquid, hereinafter referred to as a "secondary ionic liquid," which is different from and non-reactive with the protic ionic liquid of Formula (1) or (4). In some embodiments, the secondary ionic liquid is protic, while in other embodiments the secondary ionic liquid is non-protic. The secondary ionic liquid should have the ability to at least partially dissolve the rare earth-containing complex resulting from reaction of the protic ionic liquid of Formula (1) or (4) with the one or more rare earth elements (RE).

The secondary ionic liquid can belong to any of the numerous classes of ionic liquids known in the art, provided it is non-reactive with the protic ionic liquid of Formula (1) or (4) and has the ability to at least partially dissolve the rare earth-containing complex resulting from reaction of the protic ionic liquid of Formula (1) or (4) with the one or more rare earth elements (RE). The secondary ionic liquid can be conveniently described by the formula (Y$^+$)(X$^-$), wherein Y$^+$ is a cationic component of the ionic liquid and X$^-$ is an anionic component of the ionic liquid. The formula (Y$^+$)(X$^-$) is meant to encompass a cationic component (Y$^+$) having any valency of positive charge, and an anionic component (X$^-$) having any valency of negative charge, provided that the charge contributions from the cationic portion and anionic portion are counterbalanced in order for charge neutrality to be preserved in the ionic liquid molecule. More specifically, the formula (Y$^+$)(X$^-$) is meant to encompass the more generic formula (Y$^{+a}$)$_w$(X$^{-b}$)$_x$, wherein the variables a and b are, independently, non-zero integers, and the subscript variables w and x are, independently, non-zero integers, such that a.w=b.x (wherein the period placed between variables indicates multiplication of the variables). The foregoing generic formula encompasses numerous possible sub-formulas, such as, for example, (Y$^+$)(X$^-$), (Y$^{+2}$)(X$^-$)$_2$, (Y$^+$)$_2$(X$^{-2}$), (Y$^{+2}$)$_2$(X$^{-2}$)$_2$, (Y$^{+3}$)(X)$_3$, (Y$^+$)$_3$(X$^{-3}$), (Y$^{+3}$)$_2$(X$^{-2}$)$_3$, and (Y$^{+2}$)$_3$(X$^{-3}$)$_2$.

In some embodiments, the cationic group Y$^+$ of the secondary ionic liquid has the generic formula:

(6)

In Formula (6), Z is either N or P, and R$^{1a}$, R$^{2a}$, R$^{3a}$, and R$^{4a}$ are each independently selected from hydrogen atom and hydrocarbon groups (R) having at least one and up to twenty carbon atoms and optionally substituted with one or more heteroatoms selected from fluorine, nitrogen, oxygen, and sulfur, as described above for hydrocarbon groups R, provided that at least one of R$^{1a}$, R$^{2a}$, R$^{3a}$, and R$^{4a}$ is a hydrocarbon group R when Z is N, and provided that R$^{1a}$, R$^{2a}$, R$^{3a}$, and R$^{4a}$ are all hydrocarbon groups when Z is P. In particular embodiments, one, two, three, or all of R$^1$, R$^2$, R$^3$, and R$^4$ are selected from straight-chained or branched alkyl and/or alkenyl groups having at least 1, 2, 3, or 4 and up to 5, 6, 7, 8, 9, 10, 11, 12, 13, 14, 15, 16, 17, 18, 19, or 20 carbon atoms. In other embodiments, one, two, three, or all of R$^{1a}$, R$^{2a}$, R$^{3a}$, and R$^{4a}$ are selected from saturated or unsaturated cyclic hydrocarbon groups, which may be carbocyclic (e.g., cycloalkyl or aryl) or heterocyclic (e.g., heterocycloalkyl or heteroaryl).

In some embodiments of Formula (6), Z is N, which corresponds to ammonium species having the following formula:

(6a)

In Formula (6a), $R^{1a}$, $R^{2a}$, $R^{3a}$, and $R^{4a}$ are each independently selected from hydrogen atom and hydrocarbon groups (R) having at least one and up to twenty carbon atoms and optionally substituted with one or more heteroatoms selected from fluorine, nitrogen, oxygen, and sulfur, as described above for hydrocarbon groups R, provided that at least one of $R^{1a}$, $R^{2a}$, $R^{3a}$, and $R^{4a}$ is a hydrocarbon group R.

In some embodiments, one, two, three, or all of $R^{1a}$, $R^{2a}$, $R^{3a}$, and $R^{4a}$ of Formula (6a) are selected from straight-chained or branched alkyl and/or alkenyl groups having at least 1, 2, 3, or 4 and up to 5, 6, 7, 8, 9, 10, 11, 12, 13, 14, 15, 16, 17, 18, 19, or 20 carbon atoms, or at least 5, 6, 7, or 8 and up to 9, 10, 11, 12, 13, 14, 15, 16, 17, 18, 19, or 20 carbon atoms. Some examples of such ammonium species include methylammonium, ethylammonium, vinylammonium, n-propylammonium, isopropylammonium, allylammonium, n-butylammonium, isobutylammonium, n-pentylammonium, n-hexylammonium, n-heptylammonium, n-octylammonium, 2-ethylhexylammonium, n-nonylammonium, n-decylammonium, n-undecylammonium, n-dodecylammonium, dimethylammonium, diethylammonium, divinylammonium, ethylmethylammonium, dipropylammonium, methylpropylammonium, diisopropylammonium, diallylammonium, dibutylammonium, methylbutylammonium, diisobutylammonium, dipentylammonium, methylpentylammonium, dihexylammonium, diheptylammonium, dioctylammonium, di(2-ethylhexyl)ammonium, dinonylammonium, didecylammonium, didodecylammonium, trimethylammonium, dimethylethylammonium, triethylammonium, trivinylammonium, tripropylammonium, triisopropylammonium, dimethylisopropylammonium, triallylammonium, tributylammonium, triisobutylammonium, diethylisobutylammonium, ethyldiisobutylammonium, tripentylammonium, trihexylammonium, triisohexylammonium, ethyldioctylammonium, trioctylammonium, tris(isooctyl)ammonium, methylbis(2-ethylhexyl)ammonium, tris(2-ethylhexyl)ammonium, trinonylammonium, tridecylammonium, tridodecylammonium, tetramethylammonium, tetraethylammonium, tetravinylammonium, tetrapropylammonium, tetraisopropylammonium, dimethyldiisopropylammonium, tetraallylammonium, tetrabutylammonium, tetraisobutylammonium, dimethyldiisobutylammonium, diethyldiisobutylammonium, methyltriisobutylammonium, ethyltriisobutylammonium, tetrapentylammonium, tetrahexylammonium, tetraisohexylammonium, ethyltrioctylammonium, tetraoctylammonium, tetrakis(isooctyl)ammonium, methyltris(2-ethylhexyl)ammonium, ethyltris(2-ethylhexyl)ammonium, tetrakis(2-ethylhexyl)ammonium, tetranonylammonium, tetradecylammonium, and tetradodecylammonium.

In other embodiments, one, two, three, or all of $R^{1a}$, $R^{2a}$, $R^{3a}$, and $R^{4a}$ of Formula (6a) are selected from saturated or unsaturated cyclic hydrocarbon groups, which may be carbocyclic (e.g., cycloalkyl or aryl) or heterocyclic (e.g., heterocycloalkyl or heteroaryl) and may or may not include a hydrocarbon linker and/or one more hydrocarbon substituents. Some examples of such ammonium species include trimethylcyclopentylammonium, trimethylcyclohexylammonium, trimethylphenylammonium, trimethylbenzylammonium, trimethylnaphthylammonium, triethylcyclopentylammonium, triethylcyclohexylammonium, triethylphenylammonium, triethylbenzylammonium, triisopropylcyclopentylammonium, triisopropylcyclohexylammonium, triisopropylphenylammonium, triisopropylbenzylammonium, dimethylcyclopentylammonium, dimethylcyclohexylammonium, dimethylphenylammonium, dimethylbenzylammonium, diethylcyclopentylammonium, diethylcyclohexylammonium, diethylphenylammonium, diethylbenzylammonium, diisopropylcyclopentylammonium, diisopropylcyclohexylammonium, diisopropylphenylammonium, diisopropylbenzylammonium, dimethyldicyclopentylammonium, dimethyldicyclohexylammonium, dimethyldiphenylammonium, dimethyldibenzylammonium, diethyldicyclopentylammonium, diethyldicyclohexylammonium, diethyldiphenylammonium, diethyldibenzylammonium, diisopropyldicyclopentylammonium, diisopropyldicyclohexylammonium, diisopropyldiphenylammonium, diisopropyldibenzylammonium, dihexyldiphenylammonium, dioctyldiphenylammonium, dihexyldibenzylammonium, dioctyldibenzylammonium, methyltricyclopentylammonium, methyltricyclohexylammonium, methyltriphenylammonium, methyltribenzylammonium, ethyltricyclopentylammonium, ethyltricyclohexylammonium, ethyltriphenylammonium, ethyltribenzylammonium, isopropyltricyclopentylammonium, isopropyltricyclohexylammonium, isopropyltriphenylammonium, hexyltriphenylammonium, octyltriphenylammonium, isopropyltribenzylammonium, hexyltribenzylammonium, octyltribenzylammonium, tetracyclopentylammonium, tetracyclohexylammonium, tetraphenylammonium, and tetrabenzylammonium.

In some embodiments of Formula (6), Z is P, which corresponds to phosphonium species having the following formula:

(6b)

In Formula (6b), $R^{1a}$, $R^{2a}$, $R^{3a}$, and $R^{4a}$ are each independently selected from hydrocarbon groups (R) having at least one and up to twenty carbon atoms and optionally substituted with one or more heteroatoms selected from fluorine, nitrogen, oxygen, and sulfur, as described above for hydrocarbon groups R. In particular embodiments, one, two, three, or all of $R^{1a}$, $R^{2a}$, $R^{3a}$, and $R^{4a}$ are selected from straight-chained or branched alkyl and/or alkenyl groups having at least 1, 2, 3, or 4 and up to 5, 6, 7, 8, 9, 10, 11, 12, 13, 14, 15, 16, 17, 18, 19, or 20 carbon atoms, or at least 5, 6, 7, or 8 and up to 9, 10, 11, 12, 13, 14, 15, 16, 17, 18, 19, or 20 carbon atoms. In other embodiments, one, two, three, or all of $R^{1a}$, $R^{2a}$, $R^{3a}$, and $R^{4a}$ are selected from saturated or unsaturated cyclic hydrocarbon groups, which may be carbocyclic (e.g., cycloalkyl or aryl) or heterocyclic (e.g., heterocycloalkyl or heteroaryl).

In some embodiments of Formula (6b), $R^{1a}$, $R^{2a}$, $R^{3a}$, and $R^{4a}$ of Formula (6b) are selected from straight-chained or branched alkyl and/or alkenyl groups having at least 1, 2, 3, or 4 and up to 5, 6, 7, 8, 9, 10, 11, 12, 13, 14, 15, 16, 17, 18, 19, or 20 carbon atoms, or at least 5, 6, 7, or 8 and up to 9, 10, 11, 12, 13, 14, 15, 16, 17, 18, 19, or 20 carbon atoms. Some examples of such phosphonium species include tetramethylphosphonium, tetraethylphosphonium, tetravinylphosphonium, tetrapropylphosphonium, tetraisopropylphosphonium, dimethyldiisopropylphosphonium, tetraallylphosphonium, tetrabutylphosphonium, tetraisobutylphosphonium, dimethyldiisobutylphosphonium, diethyldiisobutylphosphonium, methyltriisobutylphosphonium, ethyltriisobutylphosphonium, tetrapentylphosphonium, tetrahexylphosphonium, tetrakis (isohexyl)phosphonium, ethyltrioctylphosphonium, tetraoctylphosphonium, tetrakis(isooctyl)phosphonium, methyltris(2-ethylhexyl)phosphonium, ethyltris(2-ethylhexyl)phosphonium, tetrakis(2-ethylhexyl)phosphonium, trihexyldodecylphosphonium, tetranonylphosphonium, tetradecylphosphonium, and tetradodecylphosphonium.

In other embodiments, one, two, three, or all of $R^{1a}$, $R^{2a}$, $R^{3a}$, and $R^{4a}$ of Formula (6b) are selected from saturated or unsaturated cyclic hydrocarbon groups, which may be carbocyclic (e.g., cycloalkyl or aryl) or heterocyclic (e.g., heterocycloalkyl or heteroaryl) and may or may not include a hydrocarbon linker and/or one or more hydrocarbon substituents. Some examples of such phosphonium species include trimethylcyclopentylphosphonium, trimethylcyclohexylphosphonium, trimethylphenylphosphonium, trimethylbenzylphosphonium, trimethylnaphthylphosphonium, triethylcyclopentylphosphonium, triethylcyclohexylphosphonium, triethylphenylphosphonium, triethylbenzylphosphonium, triisopropylcyclopentylphosphonium, triisopropylcyclohexylphosphonium, triisopropylphenylphosphonium, triisopropylbenzylphosphonium, dimethyldicyclopentylphosphonium, dimethyldicyclohexylphosphonium, dimethyldiphenylphosphonium, dimethyldibenzylphosphonium, diethyldicyclopentylphosphonium, diethyldicyclohexylphosphonium, diethyldiphenylphosphonium, diethyldibenzylphosphonium, diisopropyldicyclopentylphosphonium, diisopropyldicyclohexylphosphonium, diisopropyldiphenylphosphonium, diisopropyldibenzylphosphonium, dihexyldiphenylphosphonium, dioctyldiphenylphosphonium, dihexyldibenzylphosphonium, dioctyldibenzylphosphonium, methyltricyclopentylphosphonium, methyltricyclohexylphosphonium, methyltriphenylphosphonium, methyltribenzylphosphonium, ethyltricyclopentylphosphonium, ethyltricyclohexylphosphonium, ethyltriphenylphosphonium, ethyltribenzylphosphonium, isopropyltricyclopentylphosphonium, isopropyltricyclohexylphosphonium, isopropyltriphenylphosphonium, hexyltriphenylphosphonium, octyltriphenylphosphonium, dodecyltriphenylphosphonium, isopropyltribenzylphosphonium, hexyltribenzylphosphonium, octyltribenzylphosphonium, tetracyclopentylphosphonium, tetracyclohexylphosphonium, tetraphenylphosphonium, and tetrabenzylphosphonium.

In the cationic species of Formula (6), two or more of $R^{1a}$, $R^{2a}$, $R^{3a}$, and $R^{4a}$ may (i.e., optionally) be combined to form one or more cyclic groups that includes Z as a ring heteroatom. By analogy, two or more of $R^{1a}$, $R^{2a}$, $R^{3a}$, and $R^{4a}$ of Formula (6a), or two or more of $R^{1a}$, $R^{2a}$, $R^{3a}$, and $R^{4a}$ of Formula (6b), may (i.e., optionally) be combined to form one or more cyclic groups that includes Z as a ring heteroatom. Thus, if $R^{1a}$ and $R^{2a}$ are taken as ethyl groups, $R^{1a}$ and $R^{2a}$ may interconnect to form a five-membered ring that includes Z. The interconnected moiety may also contain one or more heteroatoms as a ring heteroatom, in addition to Z. Alternatively, or in addition to two or more of $R^{1a}$, $R^{2a}$, $R^{3a}$, and $R^{4a}$ interconnecting to form a ring, two of $R^{1a}$, $R^{2a}$, $R^{3a}$, and $R^{4a}$ may (i.e., optionally) be combined to form a group linked to Z by a double bond.

For example, $R^{1a}$ and $R^{2a}$ in Formula (6a) or in Formula (6b) can be interconnected to result in cationic species having any of the following formulas:

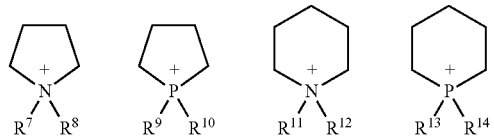

In the above formulas, $R^7$, $R^8$, $R^9$, $R^{10}$, $R^{11}$, $R^{12}$, $R^{13}$, and $R^{14}$ are each independently selected from hydrogen atom and hydrocarbon groups (R) having at least one and up to twenty carbon atoms and optionally substituted with one or more heteroatoms selected from fluorine, nitrogen, oxygen, and sulfur, as described above for hydrocarbon groups R, provided that $R^9$, $R^{10}$, $R^{13}$, and $R^{14}$ of the cyclic phosphonium species are all hydrocarbon groups R. Moreover, any of the groups, above, that are not shown as interconnected, may either interconnect with each other to make a second ring that includes N or P, or may interconnect with the existing ring to form a bicyclic structure. Some examples of such structures include:

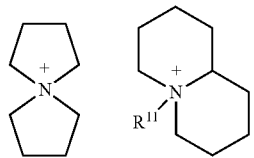

The interconnection of $R^{1a}$ and $R^{2a}$ in Formula (6a) or in Formula (6b) can also include one or more heteroatoms. Some examples of such cationic species include:

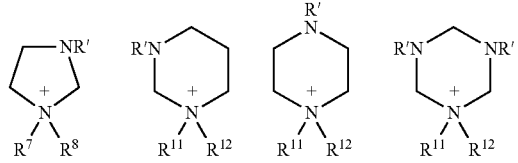

In the above structures, $R^7$, $R^8$, $R^{11}$, and $R^{12}$ are as defined above. The group R' bound to the additional one or more hydrogen atoms is independently selected from hydrogen atom and any of the hydrocarbon groups (R) described above, particularly straight-chained or branched alkyl and/or alkenyl groups having 1, 2, 3, 4, 5, or 6 carbon atoms. Although the above structures show the presence of one or more ring nitrogen atoms, the cyclic cation may also include a ring oxygen atom, such as in a morpholinium-based ionic liquid.

The interconnection of $R^{1a}$ and $R^{2a}$ in Formula (6a) or Formula (6b) can also be accompanied by one or more double bonds in the ring containing N or P. If one of the double bonds is connected to N or P in the ring, then one of $R^{3a}$ and $R^{4a}$ in Formula (6a) or in Formula (6b) participates to make a double bond in the ring. If none of the double bonds are connected to N or P in the ring, then $R^{3a}$ and $R^{4a}$ in Formula (6a) or $R^{3b}$ and $R^{ob}$ in Formula (6b) are not required to participate in making a double bond in the ring, i.e., the double bond originated in this case from one of $R^{1a}$ and $R^{2a}$ in Formula (6a) or one of $R^{1b}$ and $R^{2b}$ in Formula (6b). As above, the interconnection may or may not also include one or more heteroatoms. Some examples of such cationic species include:

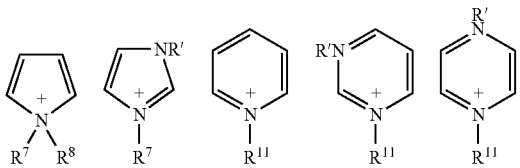

In particular embodiments, the secondary ionic liquid possesses an imidazolium species as the cationic Y+ species. The imidazolium-based ionic liquid may have a structure of the general formula:

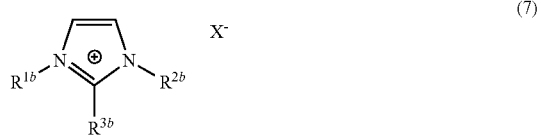

(7)

In Formula (7) above, $R^{1b}$, $R^{2b}$ and $R^{3b}$ are each independently a saturated or unsaturated, straight-chained, branched, or cyclic hydrocarbon group (R), as described above, particularly those hydrocarbon groups containing at least 1, 2, or 3 and up to 4, 5, 6, 7, 8, 9, 10, 11, or 12 carbon atoms, except that $R^{3b}$ is often a hydrogen atom instead of a hydrocarbon. $X^-$ is an anion, as also described above. In some embodiments, $R^{1b}$ and $R^{2b}$, or $R^{1b}$ and $R^{3b}$, or $R^{2b}$ and $R^{3b}$ are different in structure or number of carbon atoms, whereas in other embodiments, $R^{1b}$ and $R^{2b}$, or $R^{1b}$ and $R^{3b}$, or $R^{2b}$ and $R^{3b}$ are the same either in structure or number of carbon atoms. In different embodiments, $R^{1b}$, $R^{2b}$ and $R^{3b}$ each independently have a minimum of at least one, two, three, four, five, six, seven, or eight carbon atoms. In other embodiments, $R^{1b}$, $R^{2b}$, and $R^{3b}$ each independently have a maximum of two, three, four, five, six, seven, eight, nine, ten, eleven, twelve, thirteen, fourteen, fifteen, sixteen, seventeen, or eighteen carbon atoms. In other embodiments, $R^{1b}$, $R^{2b}$ and $R^{3b}$ independently have a number of carbon atoms within a range of carbon atoms bounded by any of the exemplary minimum and maximum carbon numbers provided above. As the double bonds shown in Formula (7) are generally delocalized, other structurally equivalent depictions may be possible for the imidazolium ring.

Some general examples of secondary ionic liquids according to Formula (7) include 1,3-dimethylimidazolium+X−, 1,2,3-trimethylimidazolium+X−, 2-ethyl-1,3-dimethylimidazolium+X−, 2-n-propyl-1,3-dimethylimidazolium+X−, 2-n-butyl-1,3-dimethylimidazolium+X−, 1-ethyl-2,3-dimethylimidazolium+X−, 1-n-propyl-2,3-dimethylimidazolium+X−, 1-n-butyl-2,3-dimethylimidazolium+X−, 1-methyl-3-ethylimidazolium+X−, 1-methyl-3-n-propylimidazolium+X−, 1-methyl-3-isopropylimidazolium+X−, 1-butyl-3-methylimidazolium+X− (i.e., BMIM+X), 1-isobutyl-3-methylimidazolium+X−, 1,3-diethylimidazolium+X−, 1-ethyl-3-n-propylimidazolium+X−, 1-ethyl-3-isopropylimidazolium+X−, 1-ethyl-3-n-butylimidazolium+X−, 1-ethyl-3-isobutylimidazolium+X−, 1-ethyl-3-sec-butylimidazolium+X−, 1-ethyl-3-t-butylimidazolium+X−, 1,3-di-n-propylimidazolium+X−, 1-n-propyl-3-isopropylimidazolium+X−, 1-n-propyl-3-n-butylimidazolium+X−, 1-n-propyl-3-isobutylimidazolium+X−, 1-n-propyl-3-sec-butylimidazolium+X−, 1-n-propyl-3-t-butylimidazolium+X−, 1,3-diisopropylimidazolium+X−, 1-isopropyl-3-n-butylimidazolium+X−, 1-isopropyl-3-isobutylimidazolium+X−, 1-isopropyl-3-sec-butylimidazolium+X−, 1-isopropyl-3-t-butylimidazolium+X−, 1,3-di-n-butylimidazolium+X−, 1-n-butyl-3-isobutylimidazolium+X−, 1-n-butyl-3-sec-butylimidazolium+X−, 1-n-butyl-3-t-butylimidazolium+X−, 1,3-diisobutylimidazolium+X−, 1-isobutyl-3-sec-butylimidazolium+X−, 1-isobutyl-3-t-butylimidazolium+X−, 1,3-di-sec-butylimidazolium+X−, 1-sec-butyl-3-t-butylimidazolium+X−, 1,3-di-t-butylimidazolium+X−, 1-methyl-3-pentylimidazolium+X−, 1-methyl-3-hexylimidazolium+X−, 1-methyl-3-heptylimidazolium+X−, 1-methyl-3-octylimidazolium+X−, 1-methyl-3-decylimidazolium+X−, 1-methyl-3-dodecylimidazolium+X−, 1-methyl-3-tetradecylimidazolium+X−, 1-methyl-3-hexadecylimidazolium+X−, 1-methyl-3-octadecylimidazolium+X−, 1-(2-hydroxyethyl)-3-methylimidazolium+X−, and 1-allyl-3-methylimidazolium+X−.

In Formula (7), one or both of the hydrogen atoms at the 4- and 5-positions may also be substituted with a group, such as a hydrocarbon group, such as any of the hydrocarbon groups described above, an alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring. For example, one or both of the 4- and 5-positions of the imidazole ring may be substituted with a methyl, ethyl, n-propyl, isopropyl, n-butyl, isobutyl, sec-butyl, or t-butyl group. $R^3$ at the 2-position may also be selected from any of the foregoing groups provided for the 4- and 5-positions. Moreover, any one or more of $R^1$, $R^2$ and $R^3$ may or may not also include an imidazole or imidazolium ring, which therefore may result in a bi-imidazolium, tri-imidazolium, or tetra-imidazolium cationic portion.

In some embodiments of Formula (7), $R^1$ and $R^3$, or $R^2$ and $R^3$ are interconnected, thereby forming an imidazolyl-containing bicyclic ring system. The interconnection can be saturated or unsaturated, and may or may not include substituting groups, as described above for the hydrocarbon groups R provided above. Some examples of ionic liquids containing such imidazolyl-containing bicyclic ring systems include those according to the following formulas:

(7a)

(7b)

In Formulas (7a) and (7b), $R^9$ and $R^{10}$ independently represent a hydrocarbon group, with or without heteroatom substitution, such as any of the hydrocarbon groups (R) described above for $R^{1b}$, $R^{2b}$ and $R^{3b}$ of Formula (7). In particular embodiments, $R^9$ and Rio are independently selected from methyl, ethyl, n-propyl, isopropyl, n-butyl, isobutyl, sec-butyl, t-butyl, n-pentyl, isopentyl, neopentyl, n-hexyl, isohexyl, vinyl, and allyl groups. Any of the hydrogen atoms at available carbon atoms in Formulas (7a) and (7b) may be substituted with a group, such as a hydrocarbon group, such as any of the hydrocarbon groups (R) described above, an alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In other particular embodiments, the secondary ionic liquid is an N-hydrocarbylpyridinium-based ionic liquid having a structure of the general formula:

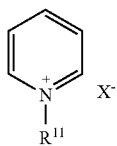
(8)

In Formula (8), $R^{11}$ represents a hydrocarbon group, with or without heteroatom substitution, such as any of the hydrocarbon groups (R) described above under Formula (7), and the anion X$^-$ can be any of the anions described above. Some general examples of N-alkylpyridinium-based ionic liquids include N-methylpyridinium$^+$X$^-$, N-ethylpyridinium$^+$X$^-$, N-n-propylpyridinium$^+$X$^-$, N-isopropylpyridinium$^+$X$^-$, N-n-butylpyridinium$^+$X$^-$, N-isobutylpyridinium$^+$X$^-$, N-sec-butylpyridinium$^+$X$^-$, N-t-butylpyridinium$^+$X$^-$, N-n-pentylpyridinium$^+$X$^-$, N-isopentylpyridinium$^+$X$^-$, N-neopentylpyridinium$^+$X$^-$, N-n-hexylpyridinium$^+$X$^-$, N-n-heptylpyridinium$^+$X$^-$, N-n-octylpyridinium$^+$X$^-$, N-n-nonylpyridinium$^+$X$^-$, N-n-decylpyridinium$^+$X$^-$, N-n-undecylpyridinium$^+$X$^-$, N-n-dodecylpyridinium$^+$X$^-$, N-n-tridecylpyridinium$^+$X$^-$, N-n-tetradecylpyridinium$^+$X$^-$, N-n-pentadecylpyridinium$^+$X$^-$, N-n-hexadecylpyridinium$^+$X$^-$, N-n-heptadecylpyridinium$^+$X$^-$, N-n-octadecylpyridinium$^+$X$^-$, N-vinylpyridinium$^+$X$^-$, N-allylpyridinium$^+$X$^-$, N-phenylpyridinium$^+$X$^-$, N-(2-hydroxyethyl)pyridinium$^+$X$^-$, N-benzylpyridinium$^+$X$^-$, and N-phenethylpyridinium$^+$X.

In Formula (8), any one or more of the hydrogen atoms on the ring carbon atoms can be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring. Some examples of such ionic liquids include N-methyl-4-methylpyridinium X$^-$, N-ethyl-4-methylpyridinium X$^-$, N-methyl-4-ethylpyridinium X$^-$, N-methyl-4-isopropylpyridinium X$^-$, N-isopropyl-4-methylpyridinium X$^-$, and N-octyl-4-methylpyridinium X. Moreover, any one or two of the ring carbon atoms ortho, meta, or para to the shown ring nitrogen atom in the pyridinium ring may be replaced with a respective number of ring nitrogen atoms, which may be neutral or positively charged ring nitrogen atoms.

In other particular embodiments, the secondary ionic liquid is a cyclic guanidinium-based ionic liquid. The cyclic guanidinium-based ionic liquid can have any of the structures known in the art, including those described in U.S. Pat. No. 8,129,543 and M. G. Bogdanov, et al., Z. Naturforsch, 65b, pp. 37-48, 2010, the contents of which are herein incorporated by reference in their entirety.

The cyclic guanidinium-based ionic liquid can be described by the following general formula:

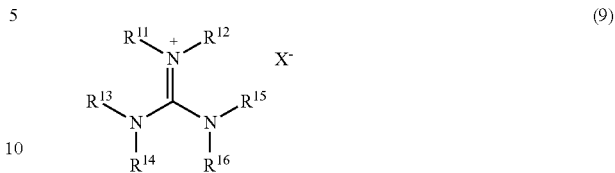
(9)

In Formula (9) above, $R^{11}$, $R^{12}$, $R^{13}$, $R^{14}$, $R^{15}$, and/or $R^{16}$ groups independently represent a hydrocarbon group, with or without heteroatom substitution, such as any of the hydrocarbon groups (R) described above, or a hydrogen atom, provided that at least two of $R^{11}$, $R^{12}$, $R^{13}$, $R^{14}$, $R^{15}$, and $R^{16}$ are interconnected to form a ring or a bicyclic, tricylic, or higher cyclic ring system. In some embodiments, $R^{11}$, $R^{12}$, $R^{13}$, $R^{14}$, $R^{15}$, and/or $R^{16}$ groups are independently selected from methyl, ethyl, n-propyl, isopropyl, n-butyl, isobutyl, sec-butyl, t-butyl, n-pentyl, isopentyl, neopentyl, n-hexyl, isohexyl, vinyl, and allyl groups, provided that at least two of $R^{11}$, $R^{12}$, $R^{13}$, $R^{14}$, $R^{15}$, and $R^{16}$ are interconnected to form a ring or a bicyclic, tricyclic, or higher cyclic ring system. In a first set of embodiments, $R^{11}$ and $R^{12}$ are interconnected. In a second set of embodiments, $R^{13}$ and $R^{14}$, or $R^{15}$ and $R^{16}$, are interconnected. In a third set of embodiments, $R^{11}$ and $R^{13}$, or $R^{12}$ and $R^{15}$, are interconnected. In a fourth set of embodiments, $R^{14}$ and $R^{16}$ are interconnected. In other embodiments, any two or three of the foregoing types of interconnections are combined.

The foregoing embodiments also include the possibility that all of $R^{11}$, $R^{12}$, $R^{13}$, $R^{14}$, $R^{15}$, and $R^{16}$ groups are engaged in an interconnection. The anion X$^-$ can be any anion, such as those described above.

In other particular embodiments, the secondary ionic liquid is a piperidinium-based ionic liquid having a structure of the following general formula:

(10)

In Formula (10), $R^{17}$ and $R^{18}$ independently represent a hydrocarbon group, with or without heteroatom substitution, such as any of the hydrocarbon groups (R) described above, and X$^-$ can be any of the anions described above. Some examples of piperidinium-based ionic liquids include 1,1-dimethylpiperidinium$^+$X$^-$, 1-methyl-1-ethylpiperidinium$^+$X$^-$, 1-methyl-1-propylpiperidinium$^+$X$^-$, 1-methyl-1-butylpiperidinium$^+$X$^-$, 1-methyl-1-isobutylpiperidinium$^+$X$^-$, 1-methyl-1-pentylpiperidinium$^+$X$^-$, 1-methyl-1-hexylpiperidinium$^+$X$^-$, 1-methyl-1-heptylpiperidinium$^+$X$^-$, 1-methyl-1-octylpiperidinium$^+$X$^-$, 1-methyl-1-decylpiperidinium$^+$X$^-$, 1-methyl-1-dodecylpiperidinium$^+$X$^-$, 1-methyl-1-tetradecylpiperidinium$^+$X$^-$, 1-methyl-1-hexadecylpiperidinium$^+$X$^-$, 1-methyl-1-octadecylpiperidinium$^+$X$^-$, 1,1-diethylpiperidinium$^+$X$^-$, 1,1-dipropylpiperidinium$^+$X$^-$, 1,1-dibutylpiperidinium$^+$X$^-$, and 1,1-diisobutylpiperidinium$^+$X. In some embodiments, the piperidinium ring shown in Formula (10) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In other particular embodiments, the secondary ionic liquid is a pyrrolidinium-based ionic liquid having a structure of the following general formula:

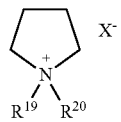

(11)

In Formula (11), $R^{19}$ and $R^{20}$ independently represent a hydrocarbon group, with or without heteroatom substitution, such as any of the hydrocarbon groups (R) described above, and the anion $X^-$ can be any of the anions described above. Some examples of pyrrolidinium-based ionic liquids include 1,1-dimethylpyrrolidinium$^+X^-$, 1-methyl-1-ethylpyrrolidinium$^+X^-$, 1-methyl-1-propylpyrrolidinium$^+X^-$, 1-methyl-1-butylpyrrolidinium$^+X^-$, 1-methyl-1-isobutylpyrrolidinium$^+X^-$, 1-methyl-1-pentylpyrrolidinium$^+X^-$, 1-methyl-1-hexylpyrrolidinium$^+X^-$, 1-methyl-1-heptylpyrrolidinium$^+X^-$, 1-methyl-1-octylpyrrolidinium$^+X^-$, 1-methyl-1-decylpyrrolidinium$^+X^-$, 1-methyl-1-dodecylpyrrolidinium$^+X^-$, 1-methyl-1-tetradecylpyrrolidinium$^+X^-$, 1-methyl-1-hexadecylpyrrolidinium$^+X^-$, 1-methyl-1-octadecylpyrrolidinium$^+X^-$, 1,1-diethylpyrrolidinium$^+X^-$, 1,1-dipropylpyrrolidinium$^+X^-$, 1,1-dibutylpyrrolidinium$^+X^-$, and 1,1-diisobutylpyrrolidinium$^+X$. In some embodiments, the pyrrolidinium ring shown in Formula (11) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In other particular embodiments, the secondary ionic liquid is a sulfonium-based ionic liquid having a structure of the following general formula:

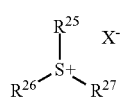

(12)

In Formula (12), $R^{25}$, $R^{26}$, and $R^{27}$ independently represent a hydrocarbon group, with or without heteroatom substitution, such as any of the hydrocarbon groups (R) described above, and the anion $X^-$ can be any of the anions described above. Some general examples of sulfonium-based ionic liquids include trimethylsulfonium$^+X^-$, dimethylethylsulfonium$^+X^-$, diethylmethylsulfonium$^+X^-$, triethylsulfonium$^+X^-$, dimethylpropylsulfonium$^+X^-$, dipropylmethylsulfonium$^+X^-$, tripropylsulfonium$^+X^-$, dimethylbutylsulfonium$^+X^-$, dibutylmethylsulfonium$^+X^-$, tributylsulfonium$^+X^-$, dimethylhexylsulfonium$^+X^-$, dihexylmethylsulfonium$^+X^-$, trihexylsulfonium$^+X^-$, dimethyloctylsulfonium$^+X^-$, dioctylmethylsulfonium$^+X^-$, and trioctylsulfonium$^+X$. In some embodiments of Formula (12), two or three of $R^{25}$, $R^{26}$, and $R^{27}$ are interconnected to form a sulfonium-containing ring or bicyclic ring system, as described above for the phosphonium cyclic systems.

In some embodiments, any of the above general classes or specific types of secondary ionic liquids, or general classes or specific types of cationic portions of the above secondary ionic liquids, are excluded from the mixing process or from the method altogether. Alternatively, in some embodiments, a mixture of two or more of the foregoing secondary ionic liquids is used.

After the mixing process has dissolved at least a portion of the at least one rare earth element into the protic ionic liquid (and optionally, a solvent in which the protic ionic liquid is dissolved), the resulting rare earth-containing complex can be separated from the solution by any of the known techniques for separating a metal-containing composition from a solution. For example, the solution may be cooled down to a sufficiently low temperature to facilitate or effect precipitation or crystallization of the metal complex from the solution. The solution may be cooled down to a temperature of, for example, 20, 15, 10, 0, −10, −20, −30° C. Alternatively, or in addition, a phase-separation facilitator may be added to the solution to effect precipitation or crystallization of the metal complex from solution. The phase-separation facilitator may be, for example, a sufficiently hydrophobic molecule, or alternatively, a highly polar molecule, such as a salt, or alternatively, a complexant or chelator (e.g., EDTA or a crown ether).

In some embodiments, the pH of the rare earth-containing solution is adjusted in such a manner as to facilitate separation of the one or more rare earth elements from the solution. In different embodiments, the solution may be adjusted to have a pH of about, at least, above, up to, or less than, for example, 1, 2, 3, 4, 5, 6, 7, 8, 9, or 10. The resulting precipitated rare earth-containing complex may be the same or different from the originally produced complex containing the neutral amide or phosphine oxide of Formulas (2) or (5). For example, the pH of the metal-containing solution may be lowered by addition of an acid (e.g., a mineral acid, such as HCl, HNO$_3$, or H$_2$SO$_4$) to convert the amide or phosphine oxide in the metal complex to its cationic form, thereby changing the metal complex into a less soluble form, which may precipitate from the solution. Significantly, the foregoing method for separating the rare earth-containing complex from solution also serves to regenerate the protic ionic liquid. In some embodiments, a complexant or chelator (such as EDTA or a crown ether) is excluded from the method.

To aid in separation of the metal complex precipitant from the solution, the solution may also be centrifuged to facilitate or effect separation. The centrifugation can be conducted at any suitable angular velocity, such as an angular velocity of about, at least, above, up to, or below 1000, 2000, 5000, 10,000, 15,000, 20,000, 25,000, or 30,000, or any angular velocity within a range bounded by any two of these values.

In the mixing process, the protic ionic liquid may or may not be admixed with one or more surfactants. The surfactants can be included to, for example, enhance the efficiency of extraction of the rare earth elements. In one embodiment, the one or more surfactants include an ionic surfactant, which can be either an anionic, cationic, or zwitterionic surfactant. Some examples of anionic surfactants include the fluorinated and non-fluorinated carboxylates (e.g., perfluorooctanoates, perfluorodecanoates, perfluorotetradecanoates, octanoates, decanoates, tetradecanoates, fatty acid salts), the fluorinated and non-fluorinated sulfonates (e.g., perfluorooctanesulfonates, perfluorodecanesulfonates, octanesulfonates, decanesulfonates, alkyl benzene sulfonate), and the fluorinated and non-fluorinated sulfate salts (e.g., dodecyl sulfates, lauryl sulfates, sodium lauryl ether sulfate, perfluorododecyl sulfate, and other alkyl and perfluoroalkyl sulfate salts). The majority of cationic surfactants contain a positively charged nitrogen atom, such as found in the quaternary ammonium surfactants, e.g., the alkyltrimethylammonium salts wherein the alkyl group typically possesses at least four carbon atoms and up to 14, 16, 18, 20, 22, 24, or 26 carbon atoms. Some examples of cationic surfactants include the quaternary ammonium surfactants (e.g., cetyl trimethylammonium bromide, benzalkonium chloride, and benzethonium chloride), the pyridinium surfactants (e.g., cetylpyridinium chloride), and the polyethoxylated amine surfactants (e.g., polyethoxylated tallow amine). Some examples of zwitterionic surfactants include the betaines (e.g., dodecyl betaine, cocamidopropyl betaine) and the glycinates. Some examples of non-ionic surfactants include the alkyl polyethyleneoxides, alkylphenol polyethyleneoxides, copolymers of polyethyleneoxide and polypropyleneoxide (e.g., poloxamers and poloxamines), alkyl polyglucosides (e.g., octyl glucoside, decyl maltoside), fatty alcohols, (e.g., cetyl alcohol, oleyl alcohol), fatty amides (e.g., cocamide MEA, cocamide DEA), and polysorbates (e.g., polysorbate 20, polysorbate 40, polysorbate 60, polysorbate 80).

In the mixing process, the protic ionic liquid may or may not be admixed with one or more extractant molecules to further enhance the extraction efficiency. The extractant molecule is generally a neutral (i.e., non-ionic) or negatively-charged molecule, typically non-polymeric and not an ionic liquid, typically having a molecular weight of up to or less than, for example, 5000, 2000, 1000, 500, 200, 100, or 50 g/mole. Any one or more classes or specific types of extractant molecules set forth below may be excluded from the mixing process or from the rare earth extraction or recovery process altogether.

In a first set of embodiments, the extractant molecule has a structure according to the following general formula:

(13)

In Formula (13) above, $R^{28}$ and $R^{29}$ are independently any of the unsubstituted or substituted hydrocarbon groups (R) described above, and subscript r can be 0 (resulting in a vicinal diketone) or precisely, at least, above, or up to, for example, 1, 2, 3, 4, 5, 6, 7, 8, 9, 10, 11, or 12, thereby resulting in a linker having an equivalent number of linking atoms. In one embodiment, the linker subtended by r is composed of only carbon atoms, as found in acetylacetate (wherein $R^{28}$ and $R^{29}$ are both methyl groups and r is 1). In other embodiments, the linker subtended by r includes one or more linking heteroatoms, such as —O—, —NH-, —NR—, or —S—, either by replacing a linking carbon atom or by inserting between linking carbon atoms.

In particular embodiments of Formula (13), at least one of $R^{28}$ and $R^{29}$ is an amino group, such as —$NR_2$, —NHR, or —$NH_2$, wherein the R groups are the same or different. In further particular embodiments of Formula (13), both of $R^{28}$ and $R^{29}$ are amino groups according to the following formula:

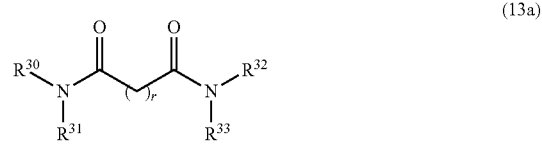

(13a)

In Formula (13a), $R^{30}$, $R^{31}$, $R^{32}$, and $R^{33}$ are independently H or any of the unsubstituted or substituted hydrocarbon groups (R) described above. In particular embodiments of Formula (10a), one, two, three, or all of $R^{30}$, $R^{31}$, $R^{32}$, and $R^{33}$ are independently selected from straight-chained or branched alkyl groups having at least two, three, four, five, six, seven, eight, nine, ten, eleven, or twelve carbon atoms, or a number of carbon atoms within a range of these numbers.

In further particular embodiments of Formula (13a), the extractant molecule is a diglycolamide having a structure according to the following general formula:

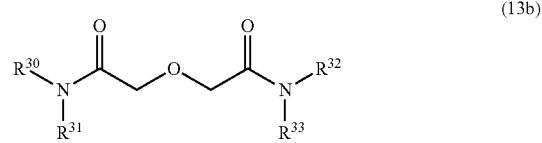

(13b)

In particular embodiments of Formula (13b), $R^{30}$, $R^{31}$, $R^{32}$, and $R^{33}$ are independently selected from methyl, ethyl, n-propyl, isopropyl, n-butyl, isobutyl, sec-butyl, t-butyl, n-pentyl, isopentyl, neopentyl, n-hexyl, isohexyl, n-heptyl, isoheptyl, n-octyl, isooctyl, n-nonyl, isononyl, n-decyl, isodecyl, n-undecyl, n-dodecyl, cyclopropyl, cyclobutyl, cyclopentyl, cyclohexyl, cycloheptyl, cyclooctyl, vinyl, allyl, phenyl, benzyl, tolyl, xylyl, and naphthyl groups. In some embodiments, $R^{30}$, $R^{31}$, $R^{32}$, and $R^{33}$ all have the same carbon number, or are all the same group. In some embodiments, $R^{30}$ and $R^{31}$, and/or $R^{32}$ and $R^{33}$ are interconnected to form a diglycolamide having one or two nitrogen-containing heterocyclic rings. A particular example of an extractant molecule according to Formula (13b) is N,N,N',N'-tetraoctyldiglycolamide (TODGA), i.e., wherein $R^{30}$, $R^{31}$, $R^{32}$, and $R^{33}$ are each octyl ($C_8H_{17}$) groups.

The linker subtended by r in Formula (13) may alternatively include or be replaced with a linking carbocyclic or heterocyclic ring. The carbocyclic ring may be, for example, a cyclohexyl, cyclohexenyl, phenyl, or naphthyl ring. The heterocyclic ring may be, for example, a pyridyl, pyrrolyl, piperidinyl, pyranyl, or furyl ring. When a heterocyclic ring is directly bound to the two shown carbonyl groups in Formula (13), in particular embodiments, the two carbonyl groups are bound in ortho positions of the heterocyclic ring. In particular embodiments, when the heterocyclic ring is a pyridine ring, the extractant molecule can have a structure of the following formula:

(13c)

In a second set of embodiments, the extractant molecule has a phosphoric acid or phosphate structure according to the following general formula:

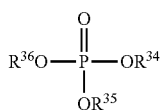
(14)

In Formula (14), $R^{34}$, $R^{35}$, and $R^{36}$ are independently H or any of the unsubstituted or substituted hydrocarbon groups (R) described above, provided that at least one of $R^{34}$, $R^{35}$, and $R^{36}$ is a hydrocarbon group (R). In particular embodiments of Formula (14), one, two, or all of $R^{34}$, $R^{35}$, and $R^{36}$ are independently selected from straight-chained or branched alkyl groups having at least two, three, four, five, six, seven, eight, nine, ten, eleven, or twelve carbon atoms, or a number of carbon atoms within a range of these numbers. In a first set of embodiments of Formula (14), one of $R^{34}$, $R^{35}$, and $R^{36}$ is a hydrocarbon group (R) while two of $R^{34}$, $R^{35}$, and $R^{36}$ are hydrogen atoms. Some examples of such compounds include monoethylphosphoric acid, monoisopropylphosphoric acid, mono(n-butyl)phosphoric acid, monoisobutylphosphoric acid, monoisopentylphosphoric acid, mononeopentylphosphoric acid, and mono(2-ethylhexyl)phosphoric acid (H2MEHP). In a second set of embodiments of Formula (14), two of $R^{34}$, $R^{35}$, and $R^{36}$ are independently selected from hydrocarbon groups (R) while one of $R^{34}$, $R^{35}$, and $R^{36}$ is a hydrogen atom. Some examples of such compounds include diethylphosphoric acid, diisopropylphosphoric acid, di(n-butyl)phosphoric acid, diisobutylphosphoric acid, diisopentylphosphoric acid, di(neopentyl)phosphoric acid, dioctylphosphoric acid, and di(2-ethylhexyl)phosphoric acid (HDEHP). In a third set of embodiments of Formula (14), all three of $R^{34}$, $R^{35}$, and $R^{36}$ are independently selected from hydrocarbon groups (R). Some examples of such compounds include triethylphosphate, triisopropylphosphate, tri(n-butyl)phosphate, triisobutylphosphate, triisopentylphosphate, tri(neopentyl) phosphate, trioctylphosphate, tricresylphosphate, dicresylphenylphosphate, and tris(2-ethylhexyl)phosphate (TEHP).

In a third set of embodiments, the extractant molecule has an amide structure according to the following general formula:

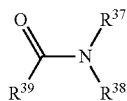
(15)

In Formula (15), $R^{37}$, $R^{38}$, and $R^{39}$ are independently H or any of the unsubstituted or substituted hydrocarbon groups (R) described above, provided that at least one of $R^{37}$, $R^{38}$, and $R^{39}$ is a hydrocarbon group (R). Typically, at least $R^{39}$ is a hydrocarbon group (R), and more typically, at least $R^{39}$ and at least one or both of $R^{37}$ and $R^{38}$ are hydrocarbon groups (R). In particular embodiments of Formula (15), one, two, or all of $R^{37}$, $R^{38}$, and $R^{39}$ are independently selected from straight-chained or branched alkyl groups having at least two, three, four, five, six, seven, eight, nine, ten, eleven, or twelve carbon atoms, or a number of carbon atoms within a range of these numbers. In a first set of embodiments of Formula (15), one of $R^{37}$, $R^{38}$, and $R^{39}$ is a hydrocarbon group (R) while two of $R^{37}$, $R^{38}$, and $R^{39}$ are hydrogen atoms. In a second set of embodiments of Formula (15), two of $R^{37}$, $R^{38}$, and $R^{39}$ are independently selected from hydrocarbon groups (R) while one of $R^{37}$, $R^{38}$, and $R^{39}$ is a hydrogen atom. In a third set of embodiments of Formula (15), all three of $R^{37}$, $R^{38}$, and $R^{39}$ are independently selected from hydrocarbon groups (R). Some examples of compounds of Formula (15) include N,N-di-(2-ethylhexyl)-3-methylbutanamide, N,N-di-(2-ethylhexyl)-2-methylpropanamide, N,N-di-(2-ethylhexyl)—2,2-dimethylpropanamide, and N,N-di-(2-ethylhexyl)-2-ethylhexanamide.

In some embodiments, the solution containing the rare earth-containing complex dissolved in the protic ionic liquid (and optionally, solvent) is subjected to an electroplating process that results in electrodeposition of the one or more rare earth elements from the solution. The general methodology and conditions for such an electrodeposition process are well known in the art, such as described in detail in E. Bourbos et al., ERES2014: 1$^{st}$ European Rare Earth Resources Conference (Milos) 04-07/09/2014, pp. 156-162 and U.S. Pat. No. 6,306,276. Notably, the methodology and conditions known in the art for electrodeposition of rare earth metals may require adjustment (e.g., in pH) to prevent degradation of the particular ionic liquids used in the above-described extraction method, and also to prevent degradation of the rare earth complex dissolved in solution so that the rare earth complex remains dissolved and does not precipitate from solution.

Examples have been set forth below for the purpose of illustration and to describe certain specific embodiments of the invention. However, the scope of this invention is not to be in any way limited by the examples set forth herein.

EXAMPLES

Synthesis of the Protic Ionic Liquid N,N-dimethylacetamidium bis(trifluoromethylsulfonyl)imide, i.e., (DMAH$^+$ NTf$_2^-$) (under Formula (1) above)

Batches of DMAH$^+$NTf$_2^-$ ionic liquid were synthesized by combining the neutralization and metathesis methodologies previously described in H. Luo et al., Separation Science and Technology, 45: 1679-1688, 2010. At room temperature, N,N-dimethylacetamide (4.03 g, 0.046 mol) was mixed with a slight excess of concentrated aqueous HCl, and LiNTf$_2$ dissolved in deionized water was added in an equal molar ratio to this mixture. After stirring, two phases were present with water on the top and DMAH$^+$ NTf$_2^-$ on the bottom. The IL layer was separated from the water and washed several times with deionized water to remove any LiCl still in the IL. The resulting nearly colorless liquid was dried under vacuum at 70° C. for 4 hours and characterized by thermogravimetric analysis and NMR spectroscopy. Yield: 94%. $^1$H NMR (400.13 MHz, CDCl$_3$): δ=8.07 (br., 1 H), 3.33 (s, 3 H), 3.26 (s, 3 H), 2.48 (s, 3 H) ppm. $^{13}$C NMR (100.61 MHz, CDCl$_3$): δ=174.45 (C), 119.57 (q, JC,F=320.1 Hz, CF$_3$), 39.69 (CH$_3$), 37.68 (CH$_3$), 17.84 (CH$_3$) ppm.

Synthesis of the Secondary Ionic Liquid 1-butyl-3-methylimidazolium bis(trifluoromethylsulfonyl)imide, i.e., (BMIM$^+$NTf$_2^-$)

The ionic liquid BMIM$^+$NTf$_2^-$ was synthesized according to a modified procedure reported in the literature (P. Bonhote, et al., *Inorg. Chem.* 1996, 35, 1168-1178). Methylimidazole (20.0 g, 243.0 mmol) was allowed to react with 1-bromobutane (34.0 g, 312.0 mmol) in dry THF under nitrogen. The mixture was stirred vigorously at room temperature for 24 hours and the resulting white precipitate was isolated and washed repeatedly with ethyl acetate (3×100 mL) to remove any unreacted starting materials. The resulting BMIM$^+$Br$^-$ salt was dried under vacuum (yield: 90%). This BMIM$^+$Br$^-$ salt (20.0 g, 105.0 mmol) was mixed with LiNTf$_2$ (45.0 g, 156.8 mmol) in water (20 mL) and the mixture was stirred overnight to obtain BMIM$^+$NTf$_2^-$ as a colorless liquid. The ionic liquid was dried in vacuo at 333 K for 24 hours. $^1$H NMR (400 MHz, [D$_6$]DMSO): δ=9.10 (s, 1 H), 7.75 (s, 1 H), 7.67 (s, 1 H), 4.19 (q, J=7.2 Hz, 2 H), 3.85 (s, 3 H), 1.42 (t, J=7.2 Hz, 3 H) ppm.

Synthesis of Rare-Earth Bastnaesite Analogues

Bastnaesite analogues containing a single lanthanide or yttrium were synthesized according to literature procedure (O. Janka, T. Schleid, *Eur. J. Inorg. Chem.* 2009, 357-362). (Y,Ln)(NO$_3$)$_3$·xH$_2$O solid (15 mmol) was dissolved in H$_2$O (250 mL) and the mixture was continuously stirred. A solution containing NaF (13 mmol) and NaHCO$_3$ (13 mmol) in H$_2$O (500 mL) was added slowly to this Ln(NO$_3$)$_3$ solution over 6 hours. The resulting solid and supernatant were then stirred for 30 minutes, filtered through 0.2 μm MilliporeTM filters and washed with 18 M H$_2$O (3×100 mL) to remove remaining NaNO$_3$ and unreacted Ln(NO$_3$)$_3$, NaF, and NaHCO$_3$. The resulting powder was collected and dried in an oven at 120° C.

A slight modification to synthesize bastnaesite analogues containing multiple REs was accomplished by blending the RE(NO$_3$)$_3$·xH$_2$O solids pre-synthesis. Table 1, below, shows the distributions of the REs in each material.

TABLE 1

Composition of synthetic bastnaesite analogues

| Rare Earth Element | Bastnaesite - Mountain Pass Blend (%) | Bastnaesite - 10% Heavies Blend Enriched (%) |
| --- | --- | --- |
| La | 33.8 | 17.2 |
| Ce | 49.6 | 34.4 |
| Pr | 4.1 | 5.2 |
| Nd | 11.2 | 17.2 |
| Sm | 0.9 | 4.3 |
| Eu | 0.1 | 4.3 |
| Gd | 0.2 | 3.0 |
| Tb | 0 | 0.5 |
| Dy | 0 | 3.0 |
| Ho | 0 | 0.7 |
| Er | 0 | 2.2 |
| Tm | 0 | 0.3 |
| Yb | 0 | 1.5 |
| Lu | Trace | 0.3 |
| Y | 0.1 | 5.7 |

Synthesis of Neodymium Bis(trifluoromethylsulfonyl) imide, i.e., (Nd(NTf$_2$)$_3$)

Nd(NTf$_2$)$_3$ solid was prepared according to the reaction Nd$_2$O$_3$+6HNTf$_2$→2Nd(NTf$_2$)$_3$+3H$_2$O. Nd$_2$O$_3$ (5.2 mmol, 1.74 g) was suspended by stirring in deionized water (5 mL) at 20° C. as 80% HNTf$_2$ (10.9 g) was added to the solution. When no Nd$_2$O$_3$ remained, the solution was heated to 120° C. under a blanket of argon (Ar) to drive off excess HNTf$_2$ and water. The resulting slightly-purple solid was titrated to determine the Nd$^{3+}$ content and identified to be Nd(NTf$_2$)$_3$·2H$_2$O. This solid was stored under Ar for later use.

X-ray Diffraction Analysis

Continuous θ-2 θ scans were performed with a PANalytical® Empyrean diffractometer equipped with a Pixcel® 3D detector from nominally 15 to 90° 2 θ in 10 minutes using Cu-Kα radiation (l=1.5405981 Å) and an X'Celerator detector. All the scans used ½° fixed slits and 1° anti-scatter slits. A search match was conducted by using the "Jade" and/or HighScore software and the International Center for Diffraction Data (ICDD) database with "HighScore Plus" software.

FTIR-ATR Spectroscopy

FTIR-ATR spectra were collected with a PerkinElmer® Frontier FTIR spectrometer equipped with a diamond ATR. Scans were performed in the range 4000-650 cm$^{-1}$ at a resolution of 4 cm$^{-1}$. The crystal was cleaned in between runs with 2-propanol.

Rare-Earth Dissolution

In this experiment, the acidic amide ionic liquid (IL) N,N-dimethylacetamidium bis-(trifluoromethylsulfonyl) imide (DMAH$^+$NTf$_2^-$) in 1-butyl-3-methylimidazolium bis (trifluoromethylsulfonyl)imide (BMIM$^+$NTF$_2^-$) diluent was used to dissolve froth flotation concentrate bastnaesite and synthetic bastnaesite analogues [RE(CO$_3$)F]. To recycle the DMAH$^+$NTF$_2^-$ a strong mineral acid is required for reprotonation. FIG. 1 shows the structures of the cationic and anionic components of the ionic liquids studied in the following experiments.

A 2 mol/kg DMAH$^+$NTf$_2^-$ solution in BMIM$^+$NTf$_2^-$ was used to dissolve the bastnaesite analogues Nd$_2$(CO$_3$)$_3$ and Nd$_2$O$_3$. For each replicate, a 10-fold excess of acid to RE was used to ensure completion of the reaction. This typically involved the contact of RE solid (0.2 mmol) with IL solution (1 g) in 4 mL borosilicate glass vials. The IL solution was heated to 120° C. prior to contact with the RE solids. The suspended solids were mixed at around 1000 rpm for 1 or 24 hours, and then exposed to the atmosphere. After the contact time, these samples were centrifuged at 3000 rpm for 40 minutes to ensure complete separation of remaining solid from the IL.

To assess the kinetics of the system on the froth flotation of bastnaesite, the temperature was set to 45° C. with stirring at 700 rpm. Aliquots of 30 μL were taken and quenched in dichloroethane (DCE). This DCE phase was then contacted with a 2% HNO$_3$ phase in a 1:1 volume ratio and agitated for 10 minutes. Under these system conditions, the RE was stripped into the aqueous phase at >99% and the IL remained behind in the DCE phase. These prepared nitric acid phases were injected into the IC.

To examine the kinetics of a larger scale version of this system, bastnaesite (3 g) was dissolved in a 10-fold excess of 2 mol/kg DMAH$^+$NTf$_2^-$ in BMIM$^+$NTf$_2^-$ solution (62.3 g) at a temperature of 45° C. with stirring at 1000 rpm. Aliquots of 100 μL were taken and quenched in DCE and stripped by using 2% HNO$_3$. The stripped solutions were diluted appropriately and investigated by inductively coupled plasma mass spectrometry.

Determination of the Rare Earth Concentration

The resulting IL phases were titrated according to previous literature on spectrophotometric RE determinations in aqueous media (e.g., M. A. E. Hafez, et al., *Analyst,* 1990, 115, 221-224). Small aliquots (10-20 μL) of the RE-containing IL phase were dissolved in 0.1 mol/L sodium acetate buffer (5 mL; pH 5). These solutions were spiked with Xylenol Orange in distilled water. A 0.01 mol/L Na$_2$EDTA solution was used to titrate the RE acetate solution. The solutions changed from red to yellow to indicate that all the $RE^{3+}$ in solution had been complexed by EDTA. Ion chromatography was used to analyze several lanthanides simultaneously by using the following eluent mixture: 63% 160 mM oxalic acid/100 mM potassium hydroxide/200 mM tetramethylammonium hydroxide, 4% 160 mM diglycolic acid/190 mM potassium hydroxide, and 33% degassed deionized water. The flow rate was set to 1.2 mL/min with a back pressure of 1750 psi. The post column reagent used was 0.5 mm 4-(2-pyridylazo)resorcinol (PAR, P/N 39672 in Met Pac PAR) post-column reagent diluent (P/N 046094). Injections of 2% nitric acid containing RE/IL aliquots allowed for baseline resolution of RE peaks (except Pr and Nd) in the chromatograms and linearity of the signal response from 50 ppb to 1 ppm. Spectrophotometric titrations were also conducted. The absorption spectra of $Nd(NTf_2)_3$ in $BMIM^+NTf_2^-$ were collected with a 1-cm path length over the wavelength range 500-900 nm with a VIS-NIR spectrophotometer equipped with a tungsten-halogen source. A 0.09 mol/kg $Nd(NTf_2)_3$ solution in $BMIM^+NTf_2^-$ was titrated with 6 mol/kg N,N-dimethylacetamide in $BMIM^+NTf_2^-$ at 120° C. The stability constants for the $Nd^{3+}$/N,N-dimethylacetamide complexes were calculated by nonlinear least-square regression in HypSpec software (P. Gans, et al., Talanta 1996, 43, 1739-1753).

Dissolution of Bastnaesite-Type Solids

Figure 2:
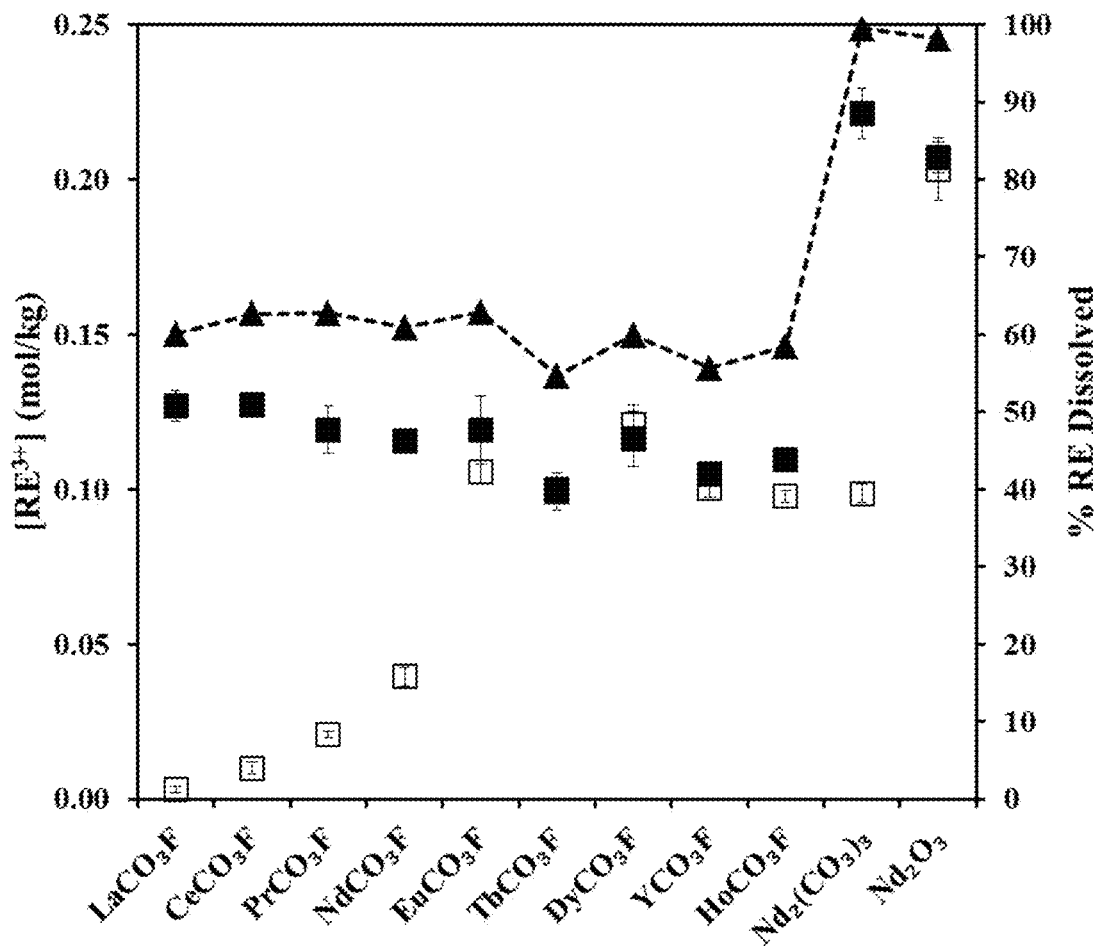
FIG. 2. Graph showing dissolution of rare earth (RE) minerals by 2 mol/kg $DMAH^+NTf_2^-$ in $BMIM^+NTf_2^-$ at 120° C. and 1000 rpm. Concentration of $RE^{3+}$, i.e., $[RE^{3+1}]$, shown at 1 hour (□) and 24 hour (■) contact times. The symbol ▲ represents the % RE dissolved at 24 hours. Error bars are twice the standard deviation at 95% confidence.

A series of rare-earth carbonate fluorides ($RECO_3F$, RE=La, Ce, Pr, Nd, Eu, Tb, Dy, Ho, Y) were synthesized for use in these dissolution studies. In addition, bastnaesite analogues containing RE blends were also synthesized (as provided in Table 1). FIG. 2 shows no selectivity during the dissolution process for the synthesized bastnaesite at 24 hours. In FIG. 2, the percentage of RE dissolved in the IL phase is defined by the following $$\% \text{ RE dissolved} = \frac{[RE^{3+}]_{IL}}{[RE^{3+}]_{total}} \times 100$$

equation:

in which $[RE^{3+}]_{IL}$ is the concentration of the $RE^{3+}$ metal in the IL phase, as determined through EDTA titration, and $[RE^{3+}]_{total}$ is the concentration of the $RE^{3+}$ metal if all of the $RECO_3F$ solid could be dissolved and exist in solution. The $RECO_3F$ solids gave an average % RE Dissolved value of 60±6%, which is lower than anticipated. As expected, the $Nd_2(CO_3)_3$ and $Nd_2O_3$ solids were quantitatively dissolved at 24 hours. An unexpected result was the slow dissolution of $LaCO_3F$, $CeCO_3F$, $PrCO_3F$, and $NdCO_3F$ compared with the heavy-RE-containing $RECO_3F$ when the media was analyzed at 1 hour. This led to an investigation of the structural identity of these materials.

Figure 3:
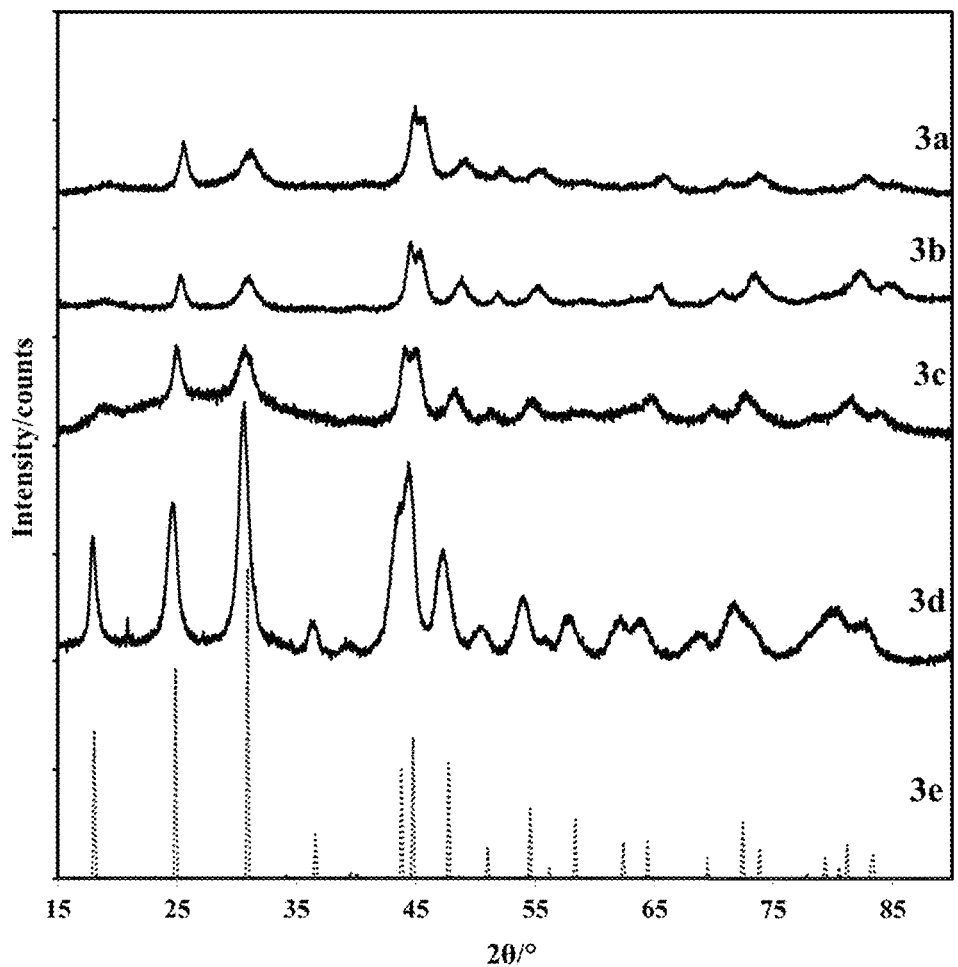
FIG. 3. Powder X-ray diffraction (PXRD) patterns labeled as 3a-3e as follows: synthesized (3a) $NdCO_3F$, (3b) $CeCO_3F$, (3c) $PrCO_3F$, (3d) $LaCO_3F$, and (3e) natural bastnaesite (La).

The synthesized bastnaesite analogues were characterized by using powder X-ray diffraction (PXRD). The PXRD patterns are shown in FIG. 3, labeled as 3a-3e as follows: synthesized (3a) $NdCO_3F$, (3b) $CeCO_3F$, (3c) $PrCO_3F$, (3d) $LaCO_3F$, and (3e) natural bastnaesite (La). As shown in FIG. 3, the PXRD patterns are in agreement with the patterns in the literature for $LaCO_3F$ and $CeCO_3F$ (O. Janka, T. Schleid, Eur. J. Inorg. Chem. 2009, 357-362; I. Oftedal, Z. Kristallogr. Kristallgeom. Kristallphys. Kristallchem., 1930, 72, 239-248; and Y. Shaohua, et al., Trans. Nonferrous Met. Soc. China 2011, 21, 2306-2310). No literature data was found for comparison with the $PrCO_3F$ or $NdCO_3F$ solids. The prepared single-$RECO_3F$ solids all appeared to crystallize as a bastnaesite-type structure with the hexagonal space group P62c for RE=La, Ce, Pr, and Nd. All four of the light lanthanides (La, Ce, Pr, Nd) show a similar diffraction pattern to that of natural bastnaesite. For the synthetic $RECO_3F$ solids with RE=Eu, Tb, Dy, Ho, and Y, the XRD patterns showed amorphous structures. Attempts to anneal these heavier RE solids, so a recognizable XRD pattern could be collected, yielded a black powder. The PXRD pattern of the black powder did not match that of $RECO_3F$ and is believed to be REOF.

Figure 4A:
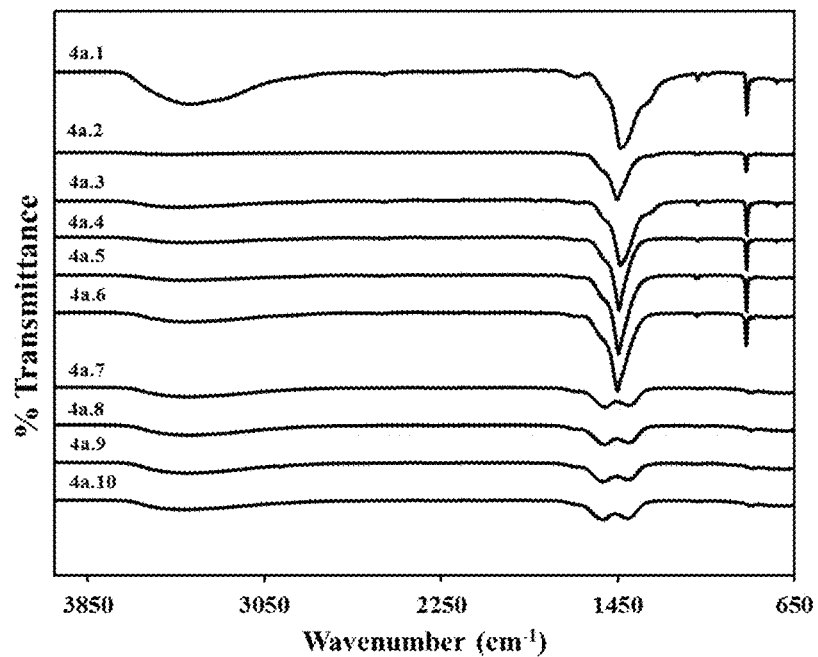
FIGS. 4A, 4B.
Figure 4B:
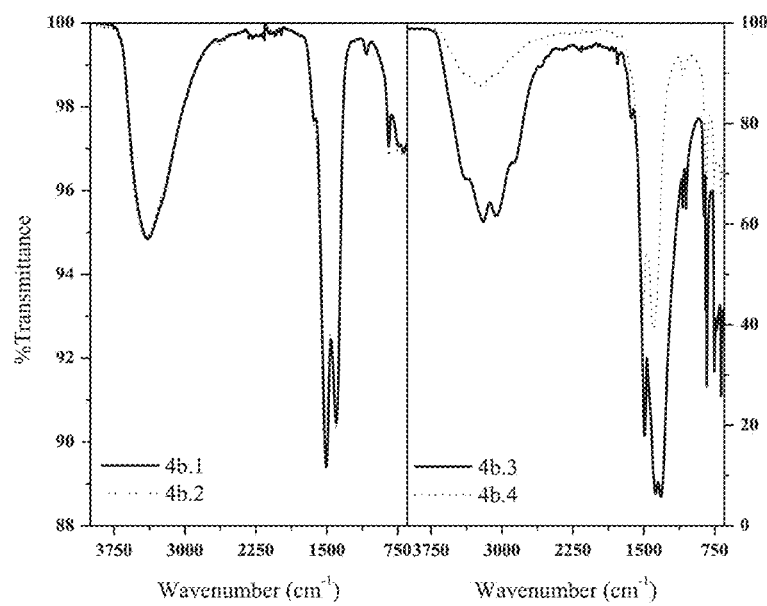

Because the PXRD patterns of the heavier RE solids showed amorphous structures, FTIR-ATR spectroscopy was used to qualitatively determine the coordination of the $CO_3^{2-}$ anion in the $RECO_3F$ matrix. FIG. 4A displays the IR spectra of a series of synthesized bastnaesite analogues containing single rare earths and blends of rare earths, and FIG. 4B compares the spectra of the heavier $TbCO_3F$ and $YCO_3F$ with those of $Tb_2(CO_3)_3$ and $Y_2(CO_3)_3$. The designations in FIGS. 4A and 4B are as follows: (4a.1) Bastnaesite-Mtn Pass Blend, (4a.2) Bastnaesite-10% Heavies Blend, (4a.3) $LaCO_3F$, (4a.4) $CeCO_3F$, (4a.5) $PrCO_3F$, (4a.6) $NdCO_3F$, (4a.7) $TbCO_3F$, (4a.8) $DyCO_3F$, (4a.9) $HoCO_3F$, (4a.10) $YCO_3F$, (4b.1) $TbCO_3F$, (4b.2) $YCO_3F$, (4b.3) $Tb_2(CO_3)_3$-$xH_2O$, and (4b.4) $Y_2(CO_3)_3$-$xH_2O$. Although the heavy-$RECO_3F$ solids do not appear to be explicitly "bastnaesite-like", it can be stated that they are not RE carbonates either. A clear change in the light- and heavy-$RECO_3F$ synthetic minerals occurs between Nd and Tb. The amorphous nature of the heavy-RE minerals coupled with the change in CO stretching at around 1500 $cm^{-1}$ between $NdCO_3F$ and $TbCO_3F$ indicates a change in the overall structure of the bastnaesite analogues.

Role of Carbonate Chemistry in Dissolution

The dissolution of $Nd_2(CO_3)_3$ was significantly slower than that of $Nd_2O_3$ and the contrast between the dissolution of carbonate and oxide species assists in providing a further understanding of the chemistry responsible for the dissolution of the bastnaesite structure in $BMIM^+NTf_2^-$. As the dissolution of the $Nd_2(CO_3)_3$ and $Nd_2O_3$ progresses at seemingly different rates, this raised the question of the role of $CO_3^{2-}$ in the interaction of $DMAH^+$ with $RECO_3F$. To further understand the role of $CO_3^{2-}$ in these systems, two tests were carried out on $HoCO_3F$, which had already been shown to have a faster dissolution within 1 hour. The first test was to run the same experiment under the same conditions, but instead cap the vial and create a closed system. The second test was to flush a stream of $CO_2(g)$ over the IL solution as the reaction proceeded. In both cases, the dissolution reaction was suppressed and only 8.2±4% of the $HoCO_3F$ dissolved within 1 hour instead of the 53 ±5% (FIG. 2) that dissolved in the open system. This appears to be in agreement with the observation of gas evolution through the IL; chemical intuition hints that this is most likely $CO_2(g)$. Therefore, it appears that the $Nd_2O_3$ is dissolved by the $DMAH^+NTf_2^-$ according to the following reaction:

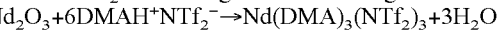

whereas, most likely, $Nd_2(CO_3)_3$ is dissolved in two reactions:

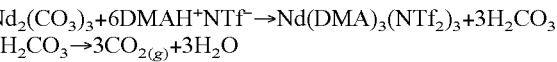

As a result of carbonic acid disproportionation in the IL, it seems that this reaction slows down the dissolution process as the system waits to expel $CO_2(g)$.

Rare-Earth Fluoride Precipitation

Figure 5:
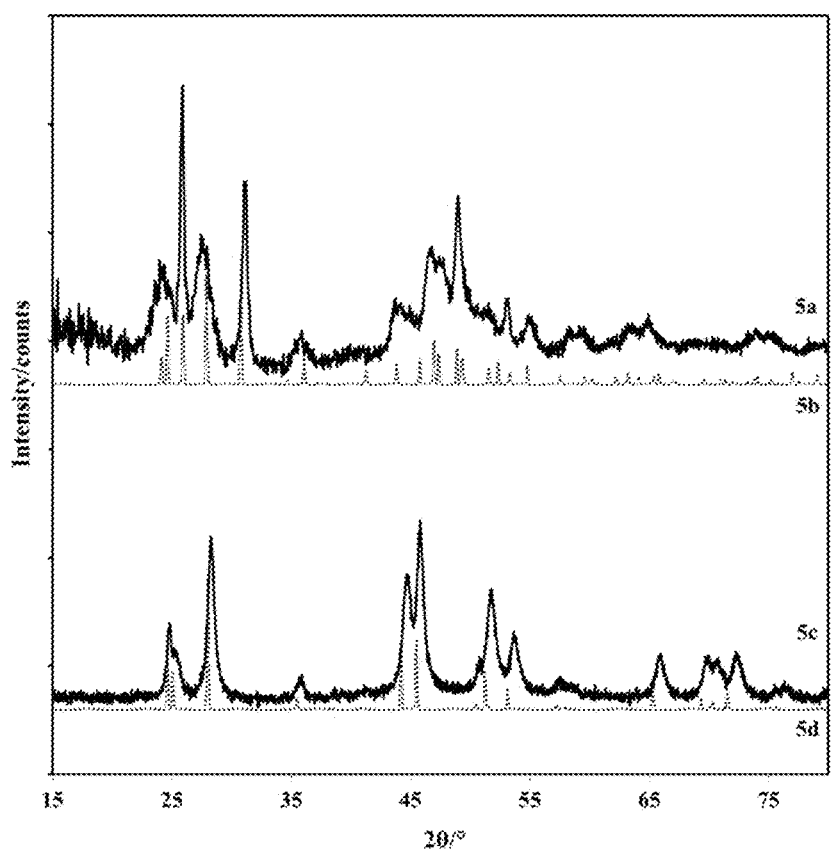
FIG. 5. PXRD patterns of $HoCO_3F$ post-dissolution, designated as (5a) $HoF_3$ with literature comparison (5b) and $NdCO_3F$ post-dissolution as (5c) $NdF_3$ and the literature comparison (5d) after 5 hours.

After each $RECO_3F$ dissolution experiment, solid remained in the bottom of each vial. This solid was analyzed by PXRD and determined to be $REF_3(s)$, as shown by the PXRD patterns in FIG. 5, with the patterns designated as (5a) HoF$_3$ with literature comparison (5b) and NdCO$_3$F post-dissolution as (5c) NdF$_3$ and the literature comparison (5d) after 5 hours. A light (Nd) and heavy (Ho) RECO$_3$F were chosen for analysis, post-dissolution.

Figure 6:
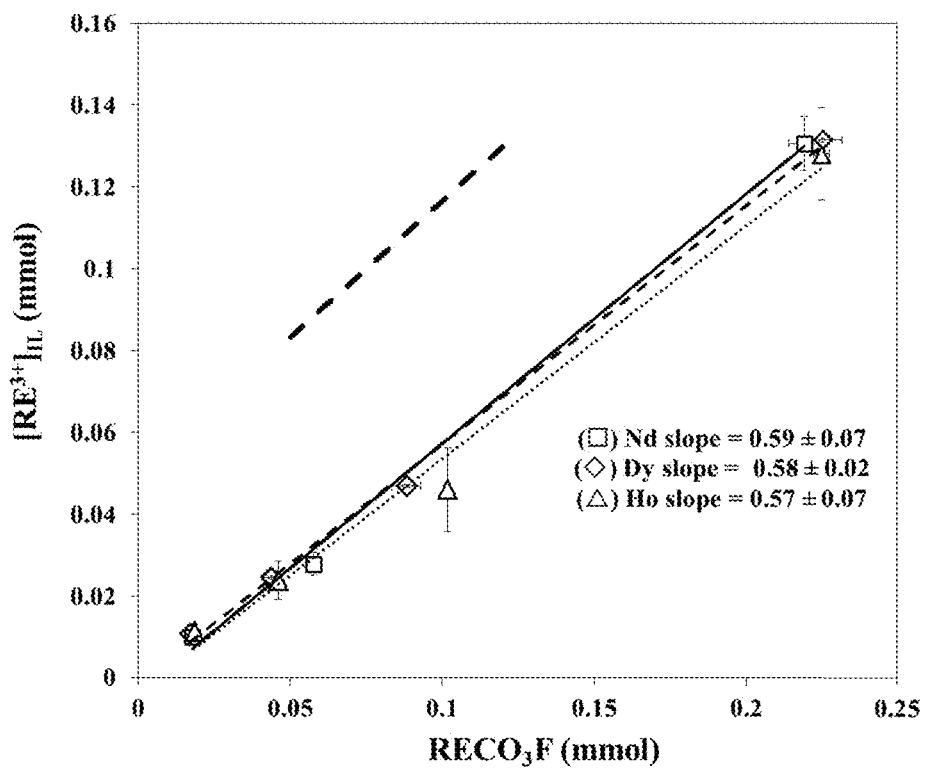
FIG. 6. Dissolution of $NdCO_3F$ (□), $DyCO_3F$ (◊), and $HoCO_3F$ (Δ) for varying total amounts of $RECO_3F$ in a system in contact with 2 mol/kg $DMAH^+NTf_2^-$ in $BMIM^+NTf_2^-$ at 120° C. and 1000 rpm for 5 hours. A dashed line with a slope of ⅔ is provided for comparison.

In addition to the formation of REF$_3$ post-dissolution, the RE$^{3+}$ in the IL phase was also analyzed for varying total amounts of RECO$_3$F. As shown by the graph in FIG. 6, the number of mmol of RE$^{3+}$ in the IL phase was plotted versus the total number of mmol of RECO$_3$F(s) in the system and yielded slopes of 0.6 ±0.06, 0.5 ±0.04, and 0.5 ±0.07 for Nd, Dy, and Ho, respectively, which shows that roughly ⅔ of the RE exists in the IL phase after dissolution. The observation of REF$_3$(s) coupled with the slope analysis for one light (Nd) and two heavy (Dy, Ho) REs suggests that the chemistry of dissolution of RECO$_3$F is similar across the rare-earth series.

Having established the above information, the following points can be concluded:
1) Gas evolves as a result of DMAH$^+$NTf$_2^-$ contact with RECO$_3$F, Nd$_2$(CO$_3$)$_3$, and Nd$_2$O$_3$.
2) An open system allows the dissolution process to proceed whereas a closed system or a system flushed with CO$_2$(g) suppresses the dissolution of RECO$_3$F.
3) The PXRD pattern of the resulting RE solid after RECO$_3$F is dissolved by DMAH$^+$NTf$_2^-$ indicates that REF$_3$ is a product of dissolution.
4) Only ⅔ of the RE$^{3+}$ in the system post-dissolution exists in the IL phase. The other ⅓ exists as REF$_3$ solid.
5) Acid dissociation constants in aqueous media (μ=0.0 M, 25° C.) for HF (pK$_a$=3.17) and H$_2$CO$_3$ (pK$_{a,1}$=6.35, pK$_{a,2}$=10.34) suggest that carbonic acid forms preferentially to hydrofluoric acid.

Figure 7:
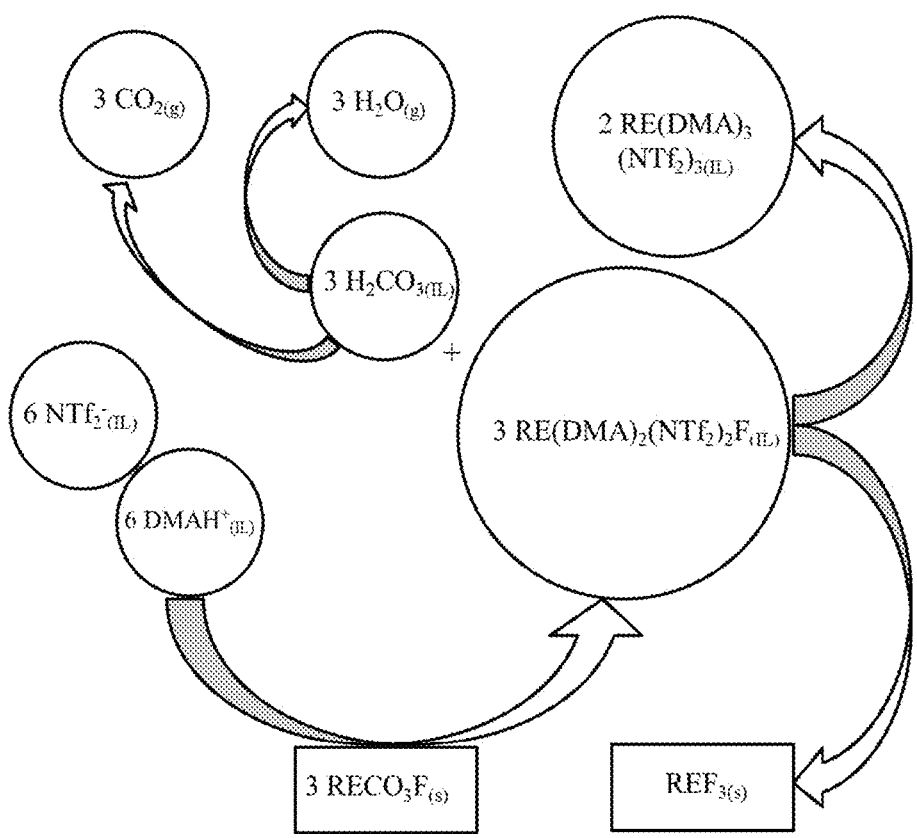
FIG. 7. Proposed reaction scheme for the dissolution process in the IL system. Lower left circles indicate initial reactive solution species, rectangles indicate solid phases, upper left circles indicate species that exist in the system as gases, and the two rightmost circles indicate RE solution species.

From these considerations, the reaction likely proceeds according to the scheme shown in FIG. 7. As shown in the scheme of FIG. 7, the surface of the RECO$_3$F reacts with the H$^+$ of DMAH$^+$ to form soluble RE(DMA)$_2$(NTf$_2$)$_2$F and carbonic acid (H$_2$CO$_3$). These two species react by two different pathways. RE(DMA)$_2$(NTf$_2$)$_2$F reacts with another RE(DMA)$_2$(NTf$_2$)$_2$F to form soluble RE(DMA)$_2$(NTf$_2$)$_3$ and insoluble REF$_S$, and H$_2$CO$_3$ produces carbon dioxide gas and water, both of which leave the IL at 120° C. Although there remains unconsumed H$^+$ ions in the IL phase, in the form of DMAH$^+$NTf$_2^-$ (pKa=−0.19 at 25° C. in sulfuric acid), it seems that the remainder of H$^+$ does not compete with RE$^{3+}$ for F$^-$, and REF$_3$(s) precipitates out of solution as a result. The following dissolution reactions are proposed:
3RECO$_3$F(s)+6 DMAH$^+$NTf$_2^-$→3RE(DMA)$_2$(NTf$_2$)$_2$F+3H$_2$CO$_3$
3RE(DMA)$_2$(NTf$_2$)$_2$F→REF$_3$(s)+2RE(DMA)$_3$(NTf$_2$)$_3$
3H$_2$CO$_3$→3CO$_{2(g)}$+3H$_2$O
3RECO$_3$F(s)+6DMAH$^+$NTf$_2^-$→3RE(DMA)$_3$(NTf$_2$)$_3$ +REF$_{3(s)}$+3CO$_{2(g)}$+3H$_2$O Solution Chemistry of Nd$^{3+}$ in BMIM$^+$NTf$_2^-$ Secondary IL As the RECO$_3$F mineral is dissolved by DMAH$^+$NTf$_2^-$, the RE$^{3+}$ species that is liberated from the solid phase becomes solvated by the constituents of the IL phase. In this system, DMA, DMAH$^+$NTf$_2^-$ and BMIM$^+$NTf$_2^-$ are present in sufficient concentrations to accomplish the task of RE$^{3+}$ solvation. The following equilibrium was considered for ascertaining Nd$^{3+}$ speciation in BMIM$^+$NTf$_2^-$:
Nd$^{3+}$+nDMA Nd(DMA)$_n^{3+}$ (n=1-5)

Figure 8A:
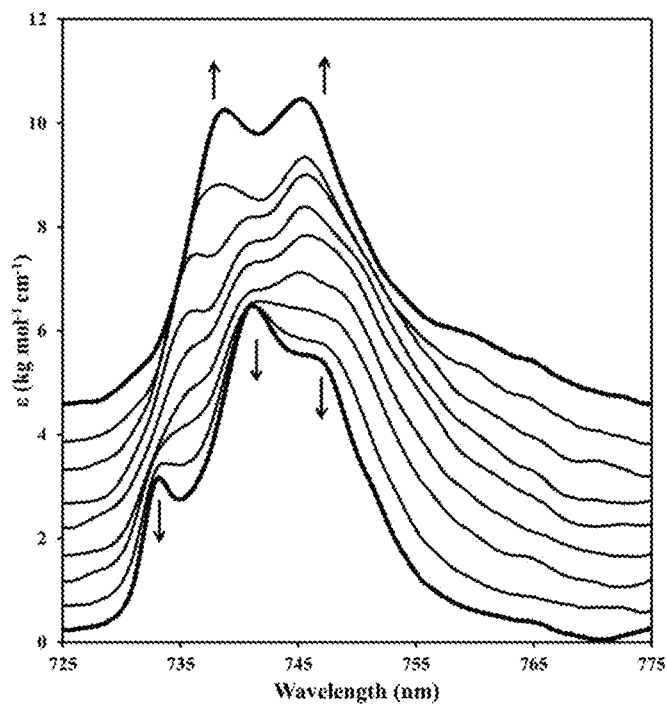
FIGS. 8A, 8B.
Figure 8B:
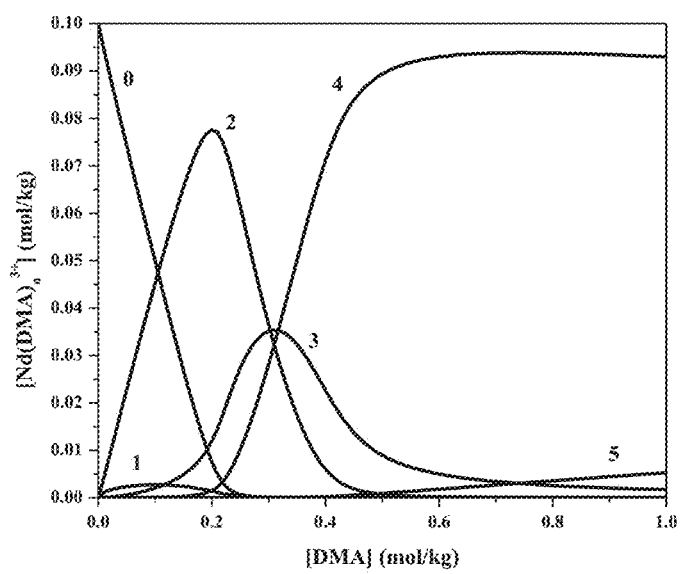

FIG. 8A shows absorbance spectra and FIG. 8B shows speciation of Nd$^{3+}$ in BMIM$^+$NTf$_2^-$ at 120° C. The following species are present: 0: Nd$^{3+}$; 1: Nd(DMA)$^{3+}$; 2: Nd(DMA)$_2^{3+}$; 3: Nd(DMA)$_3^{3+}$; 4: Nd(DMA)$_4^{3+}$; 5: Nd(DMA)$_5^{3+}$. Experimental Nd$^{3+}$/DMA ratios range from 1:0 to 1:7.25. Note: the Nd spectra are shifted in order to display the features of each. The final Nd$^{3+}$/DMA species was found to be a 1:5 complex in BMIM$^+$NTf$_2^-$ at 120° C. as no further spectral features evolved as a result of increasing the Nd$^{3+}$/DMA ratio beyond 1:7. FIG. 8A shows the hypersensitive 4F$_{5/2}$, 2H$_{9/2}$ 4I$_{9/2}$ transition of the Nd$^{3+}$ ion (D. G. Karraker, Inorg. Chem. 1968, 7, 473) as it is complexed at increasing concentration of N,N-dimethylacetamide, the conjugate base of the acidic ionic liquid DMAH$^+$NTf$_2^-$. FIG. 8B displays the speciation of the metal as a result of the best-fit stability constants for these Nd$^{3+}$/DMA complexes determined as log β$_{101}$=2.1±0.05, log β$_{102}$=6.7±0.05, log β$_{103}$=8.76±0.05, log β$_{104}$=10.72±0.05, and log 13$_{105}$=9.70 ±0.05. For the dissolution process under the experimental conditions stated earlier, the average number of ligands n bound to Nd$^{3+}$ is 2.91; however, this does not account for the number of potential DMA ligands that may bind with Nd$^{3+}$ as a result of partially dissociated DMAH$^+$, so the number may be greater.

In addition to the DMA titration of Nd$^{3+}$, DMAH$^+$NTf$_2^-$ and HNTf$_2$ were also used as titrants. HNTf$_2$ showed no interaction with Nd$^{3+}$, whereas DMAH$^+$NTf$_2^-$ showed some interaction with Nd$^{3+}$ through minor changes in the spectral features of Nd$^{3+}$, but no fit could be made of the data. However, it is not clear whether the DMAH$^+$ion interacts with Nd$^{3+}$ to form the Nd(DMAH)$^{4+}$ complex or the acid dissociates to a reasonable extent allowing for Nd$^{3+}$ and DMA to interact. If any mode of interaction occurs, it is most likely the latter.

Dissolution of Bastnaesite and Synthetic Bastnaesite RE Blends

The surprising result of a seemingly kinetically limited dissolution of light-RECO$_3$F compared with heavy-RECO$_3$F (FIG. 2) prompted an exploration of the dissolution process of natural bastnaesite. A froth flotation bastnaesite product (enriched in RE) was obtained, and two bastnaesite solids were synthesized as well. The compositions of these synthesized materials are presented in Table 1 above. The dissolution behavior of the synthesized bastnaesite materials containing the entire range of RE was not particularly intriguing as these solids dissolved in nearly the same ratios as their chemical make-up.

As was observed with the single-RE bastnaesite solids, the heavy REs in natural bastnaesite also dissolved more quickly than the light REs. To observe this phenomenon, the temperature of the system was lowered to 45° C. with a stirring rate of 700 rpm. The ratio of the total amount of heavy- to light-REs was calculated to determine the enrichment effect over time. The [RE] in the IL was determined by ion chromatography (IC). Each RE was calibrated by IC to be in the range 50 ppb-1 ppm by using the following expression:

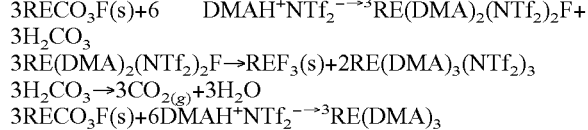

$$\text{Fraction} \frac{\text{Heavy}}{\text{Light}} = \frac{[RE^{3+}]_{Sm-Lu}}{[RE^{3+}]_{La-Nd}}$$

in which [RE$^{3+}$]$_{Sm-Lu}$ is the summation to the total heavy-rare-earth concentration in the IL phase for RE=Sm, Eu,Gd, Tb, Dy, Ho, Er, Tm, Yb, Lu, and Y, and [RE$^{3+}$]$_{La-Nd}$ is the summation to the total light-rare-earth concentration in the IL phase for RE=La, Ce, Pr, and Nd.

Figure 9:
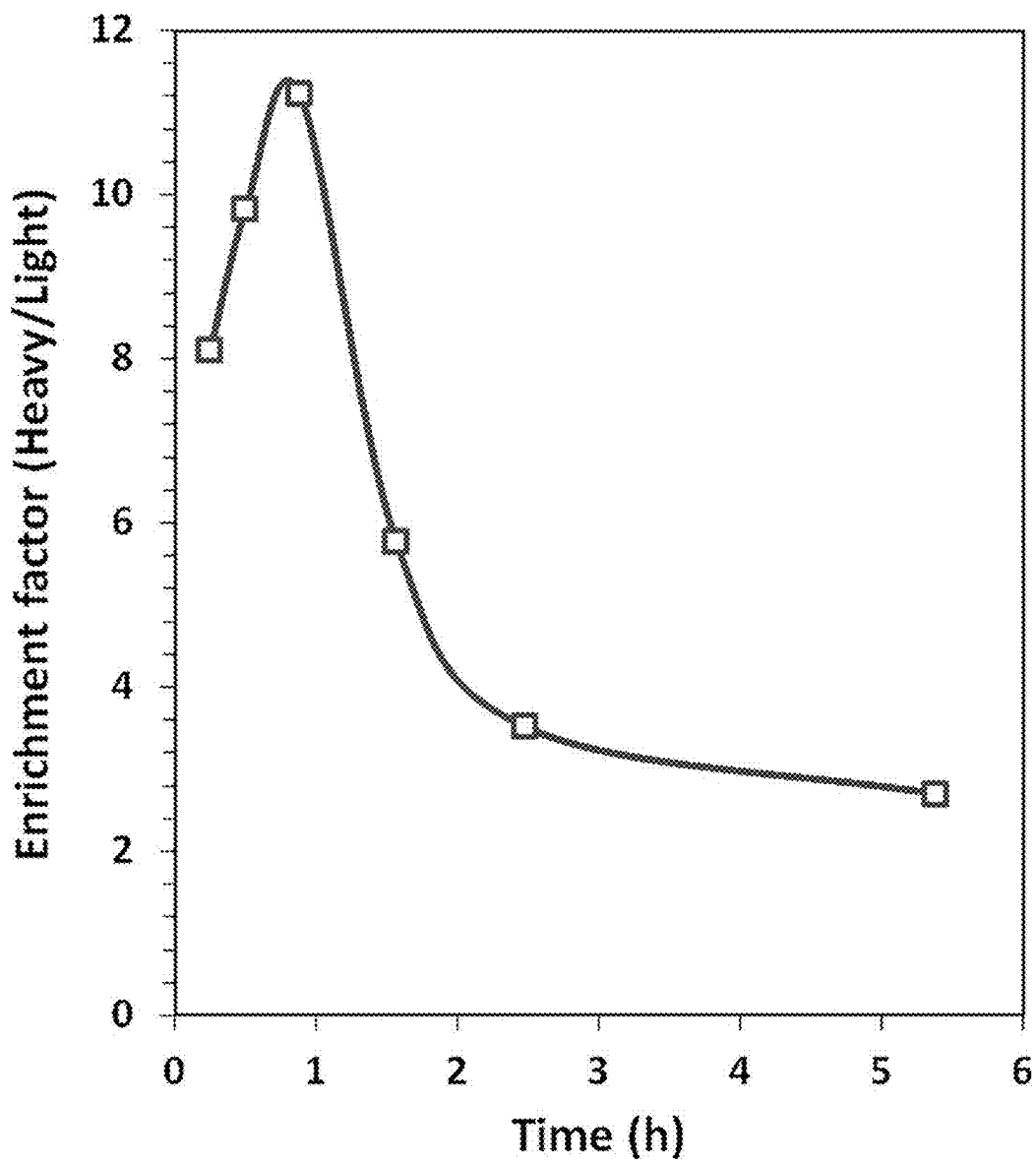
FIG. 9. Graph showing enrichment factor [quotient (□) of the heavy to light ratio in 2 mol/kg $DMAH^+NTf_2^-$ in $BMIM^+NTf_2^-$ divided by the ratio of heavy to light REs in natural bastnaesite] as a function of time. Conditions: 45° C. and 700 rpm.

FIG. 9 shows the enrichment as a function of time. Although enrichment of the heavy REs may occur near the beginning of the dissolution process, over the course of time it appears that a combination of events may occur such that the enrichment then decreases again. These events are 1) the kinetically limited dissolution of the light REs finally catching up the dissolution of the heavy REs and 2) the formation of $REF_3$ as a result of $F^-$ being liberated into the IL.

Figure 10:
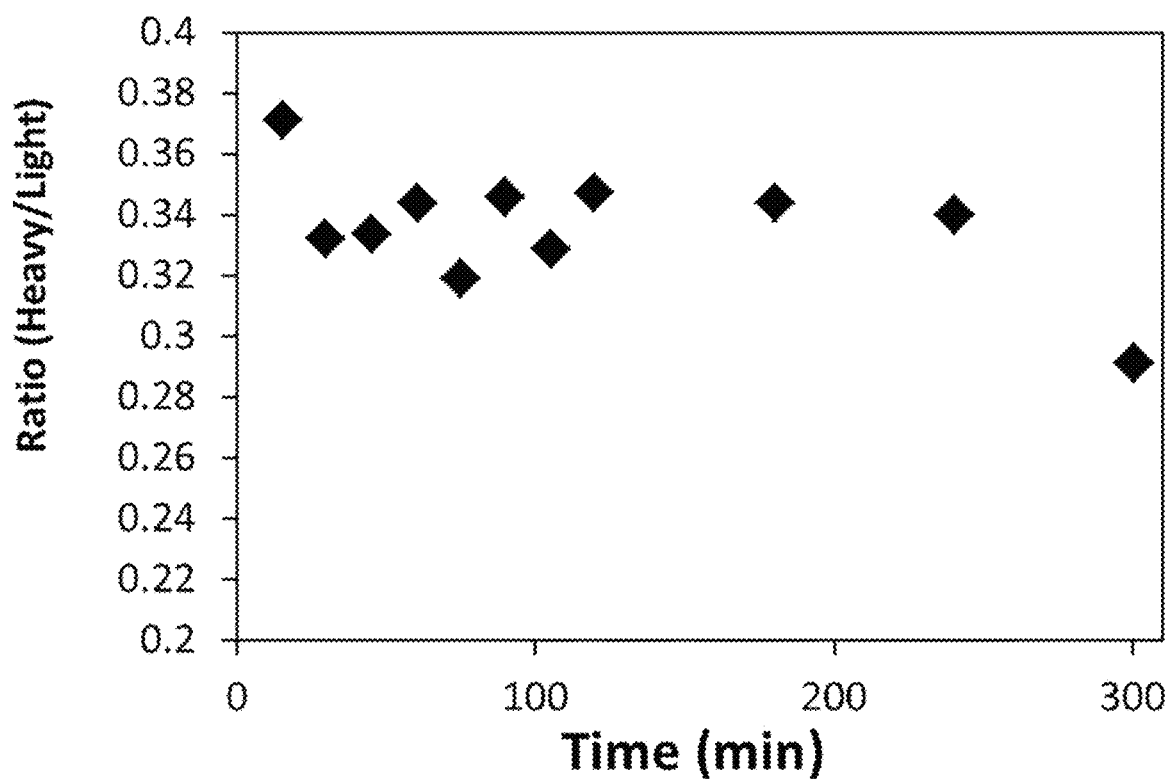
FIG. 10. Graph plotting ratio of heavy/light rare earths in 2 mol/kg $DMAH^+NTf_2^-$ in $BMIM^+NTf_2^-$ diluent as natural bastnaesite is dissolved as a function of time. Bastnaesite (3 g) was dissolved in 62.3 g of IL. Conditions: 45° C. and 700 rpm.

Although the enrichment of the heavy REs (FIG. 9) occurs up to around 1 hour, after this time the ratio of heavy REs to light REs decreases quickly. The enrichment factor changes throughout the dissolution process. This may be a result of the light REs (La-Nd) finally starting to have a greater uptake in the IL diluent. Increasing the scale of the dissolution experiment by a factor of 60 yielded a higher enrichment factor (0.37 heavy/light) than found on the smaller scale. This factor was achieved after 15 minutes of the ore being in contact with the heated ionic liquid. FIG. 10 shows the fraction of heavy/light rare earths in the stripped samples as time progresses. Over the course of 4 hours there was no substantial increase in the concentration of the rare earths in the samples; after 4 hours there was a 23% increase in the concentration of the light rare earths and virtually no increase in the concentration of the heavy rare earths.

ward. The overall dissolution reaction proposed for this IL system is as follows:

$$3RECO_3F(s)+6DMAH^+NTf_2^- \rightarrow 3RE(DMA)_3(NTf_2)_3 + REF_3(s)+3CO_2(g)+3H_2O$$

Dissolution of $RECO_3F$ by acidic phosphorous protic ionic liquids

After a rigorous study on the chemistry of dissolution and speciation of the interaction between $RECO_3F$ and $DMAH^+NTf_2^-$ in $BMIM^+NTF_2^-$, acidic phosphorous protic ionic liquids were examined. See FIG. 1 for structures of $TBPH^+$ and $TOPOH^+$ protonated phosphorus-containing species. The results of these studies are presented in Table 2 below. The results of these dissolution experiments were very similar; however, the $TBPH^+NTf_2^-$ IL, while it did dissolve the $RECO_3F$, degraded into a blackish brown liquid. Nevertheless, a promising result was that protic ionic liquids containing $TOPOH^+$, which is a protonated version of Cyanex®921, were competitive with the $DMAH^+NTf_2^-/BMIM^+NTF_2^-$ system, even at lower temperatures and contact times.

TABLE 2

Comparison of acidic amide and phosphorous-based protic ionic liquids

| TSIL | Solvent | $RECO_3F$ | Temp (°C.) | Contact Time (h) | $[RE^{3+}]$ (mol/kg) |
|---|---|---|---|---|---|
| $DMAH^+NTf_2^-$ | $BMIM^+NTf_2^-$ | $Nd_2O_3$ | 100 | 1 | 0.345 ± 0.012 |
| $DMAH^+NTf_2^-$ | $BMIM^+NTf_2^-$ | $NdCO_3F$ | 120 | 1 | 0.12 ± 0.01 |
| $TBPH^+NTf_2^-$ | $BMIM^+NTf_2^-$ | $NdCO_3F$ | 95 | 1.5 | 0.086 ± 0.003 |
| $TBPH^+NTf_2^-$ | $BMIM^+NTf_2^-$ | $DyCO_3F$ | 95 | 1.5 | 0.152 ± 0.009 |
| $TOPOH^+NTf_2^-$ | $OMIM^+NTf_2^-$ | $NdCO_3F$ | 95 | 1 | 0.0975 ± 0.013 |
| Cyanex921-$HNTf_2$ | $OMIM^+NTf_2^-$ | $NdCO_3F$ | 80 | 1 | 0.10 ± 0.02 |
| Cyanex921-HCl | $BMIM^+Cl^-$ | $NdCO_3F$ | 80 | 1 | 0.11 ± 0.02 |

This set of experiments was motivated by the froth flotation ore likely not being homogeneous and that increasing the size of the starting sample would make consistency less of a concern. The results demonstrate that froth flotation bastnaesite is likely not homogeneous, also that upscaling the process seems to affect the kinetics. The same weight ratio of naturally occurring bastnaesite ore to IL was used for both the small- and large-scale experiments. It is possible for this ionic liquid system to be used with other rare-earth minerals and gangue minerals.

In conclusion, the dissolution process of bastnaesite-type solids in an ionic liquid system has been demonstrated using the acidic amide ionic liquid (IL) N,N-dimethylacetamidium bis-(trifluoromethylsulfonyl)imide ($DMAH^+NTf_2^-$) in 1-butyl-3-methylimidazolium bis(trifluoromethylsulfonyl)imide ($BMIM^+NTF_2^-$) secondary diluent. The $RECO_3F$ bastnaesite mineral was shown to consume two acidic protons during the dissolution process and to form both soluble $RE^{3+}$ and insoluble $REF_3$. The heavy REs (Eu-Ho, Y) dissolve faster than the light REs (La-Nd) in this IL system, regardless of whether the materials are single-$RECO_3F$ or natural bastnaesite, and the process allows heavy-RE enrichment in the IL for a period of time. Although an IL system has densely concentrated ions and shows potential solvation capability and ionic interactions with the $RE^{3+}$ ions, the precipitation of $REF_3$ was not suppressed. In addition, the liberation of $CO_2$ from the dissolution process is necessary to push the reaction forward.

Systems further modified from the most analyzed system ($DMAH^+NTf_2^-/BMIM^+NTf_2^-$) appear to show similar behavior and RE dissolution behavior. In the example of the $TOPOH^+NTf_2^-/OMIM_+NTf_2^-$ system, similar performance was observed for dissolving the synthetic analogues of bastnaesite. All of the phosphorous-based protic ionic liquids reported in Table 2 likely possess good dissolution behavior by virtue of their low acid-dissociation constant (pKa).

While there have been shown and described what are at present considered the preferred embodiments of the invention, those skilled in the art may make various changes and modifications which remain within the scope of the invention defined by the appended claims.

What is claimed is:

1. A composition of the formula $(RE)(amide)_yX_z$, wherein RE is at least one trivalent rare earth element having an atomic number selected from 39, 57-71, and 90-103; y is 2-6; z is a number that charge balances the total positive charge of the at least one rare earth element (RE); X is an anionic species; and said amide has the formula:

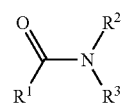

wherein $R^1$ is selected from hydrogen and hydrocarbon groups containing at least 1 and up to 12 carbon atoms; and $R^2$ and $R^3$ are independently selected from hydrocarbon groups containing at least 1 and up to 12 carbon atoms.

2. The composition of claim 1, wherein X has the formula:

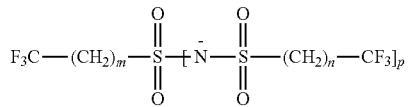

wherein m and n are independently 0 or an integer of 1 or above, and p is 0 or 1, provided that when p is 0, the group —N—SO$_2$—(CF$_2$)$_n$CF$_3$ subtended by p is replaced with an oxide atom connected to the sulfur atom, and when p is 1, the shown perfluoroalkyl groups can optionally crosslink to form a cyclic anion.

3. The composition of claim 1, wherein the at least one rare earth element is selected from the group consisting of atomic numbers of 39 and 57-71.

4. The composition of claim 1, wherein the at least one rare earth element is selected from the group consisting of lanthanum, cerium, praseodymium, neodymium, europium, terbium, dysprosium, holmium, and yttrium.

5. The composition of claim 1, wherein the at least one rare earth element comprises cerium or lanthanum.

6. The composition of claim 1, wherein $R^1$ is selected from hydrogen and hydrocarbon groups containing at least 1 and up to 6 carbon atoms; and $R^2$ and $R^3$ are independently selected from hydrocarbon groups containing at least 1 and up to 6 carbon atoms.

7. The composition of claim 1, wherein $R^1$ is selected from hydrogen and hydrocarbon groups containing at least 1 and up to 3 carbon atoms; and $R^2$ and $R^3$ are independently selected from hydrocarbon groups containing at least 1 and up to 3 carbon atoms.

8. The composition of claim 1, wherein $R^2$ and $R^3$ are methyl.

9. The composition of claim 1, wherein $R^1$, $R^2$, and $R^3$ are methyl.

10. The composition of claim 1, wherein X has the formula:

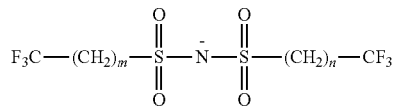

wherein m and n are independently 0 or an integer of 1 or above.

11. The composition of claim 10, wherein m and n are both 0.

* * * * *